(12) United States Patent
Kim

(10) Patent No.: US 7,854,678 B2
(45) Date of Patent: Dec. 21, 2010

(54) GEAR TRAIN OF AUTOMATIC TRANSMISSION FOR VEHICLES

(75) Inventor: Woo Yeol Kim, Gunpo (KR)

(73) Assignee: Hyundai Motor Company, Seoul (KR)

(*) Notice: Subject to any disclaimer, the term of this patent is extended or adjusted under 35 U.S.C. 154(b) by 247 days.

(21) Appl. No.: 12/324,358

(22) Filed: Nov. 26, 2008

(65) Prior Publication Data

US 2009/0270219 A1 Oct. 29, 2009

(30) Foreign Application Priority Data

Apr. 24, 2008 (KR) ............. 10-2008-0038370

(51) Int. Cl.
*F16H 3/62* (2006.01)
(52) U.S. Cl. .................... 475/276; 475/280

(58) Field of Classification Search .......... 475/271, 475/275–292
See application file for complete search history.

(56) References Cited

U.S. PATENT DOCUMENTS

| | | | |
|---|---|---|---|
| 7,780,566 B2* | 8/2010 | Seo ................... | 475/276 |
| 2009/0048062 A1* | 2/2009 | Seo et al. ............ | 475/276 |
| 2010/0184556 A1* | 7/2010 | Kim ................... | 475/276 |

* cited by examiner

*Primary Examiner*—David D Le
*Assistant Examiner*—Derek D Knight
(74) *Attorney, Agent, or Firm*—Morgan, Lewis & Bockius LLP

(57) ABSTRACT

A gear train of an automatic transmission for a vehicle includes two simple planetary gear sets and one compound planetary gear set, four clutches, and three brakes and realizes ten forward speeds and one reverse speed so that power delivery performance may be improved and fuel consumption may be reduced.

20 Claims, 17 Drawing Sheets

FIG. 2

| | C1 | C2 | C3 | C4 | B1 | B2 | B3 | Speed ratio |
|---|---|---|---|---|---|---|---|---|
| D1 | | | | | ● | | ● | 4.859 |
| D2 | | | ● | | | | ● | 3.179 |
| D3 | | | ● | | ● | | | 2.647 |
| D4 | | | ● | | | ● | | 2.010 |
| D5 | | | ● | | | | | 1.540 |
| D6 | | | ● | | | | | 1.205 |
| D7 | | ● | | ● | | | | 1.000 |
| D8 | ● | ● | | | | | | 0.876 |
| D9 | | ● | | | ● | | | 0.713 |
| D10 | | ● | | | | ● | | 0.622 |
| RS | ● | | | | | | ● | 3.831 |

GEAR TRAIN OF AUTOMATIC TRANSMISSION FOR VEHICLES

CROSS-REFERENCE TO RELATED APPLICATION

The present application claims priority to Korean Patent Application Number 10-2008-0038370 filed Apr. 24, 2008, the entire contents of which are incorporated herein for all purposes by this reference.

BACKGROUND OF THE INVENTION

1. Field of the Invention

The present invention relates to a gear train of an automatic transmission for a vehicle including two simple planetary gear sets and one compound planetary gear set, four clutches, and three brakes and realizing ten forward speeds and one reverse speed.

2. Description of Related Art

A typical shift mechanism of an automatic transmission utilizes a combination of a plurality of planetary gear sets. A gear train of such an automatic transmission including the plurality of planetary gear sets changes a rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a gear train such as durability, efficiency in power transmission, and size depend a lot on the layout of the combined planetary gear sets. Therefore, designs for a combining structure of a gear train are also under constant investigation.

A manual transmission that has too many speeds causes inconvenience of excessively frequent shifting operations to a driver. Therefore, the positive features of more shift-speeds are more important for automatic transmissions because an automatic transmission automatically controls shifting operations without needing manual operation.

In addition to various developments regarding four and five speed gear trains, gear trains of automatic transmissions realizing six forward speeds and one reverse speed have been introduced, and also, gear trains realizing a higher number of speeds are under investigation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for a vehicle that is composed of three planetary gear sets with four clutches and three brakes, and realizes ten forward speeds and one reverse speed.

In aspect of the present invention, a gear train of an automatic transmission for a vehicle may include a first planetary gear set that is a simple planetary gear set, and includes a first rotational element operating as a fixed element, a second rotational element outputting a reduced rotational speed, and a third rotational element directly connected with an input shaft and operating as an input element, a second planetary gear set that is a simple planetary gear set and includes a fourth rotational element directly connected with the second rotational element, a fifth rotational element selectively connected with a transmission housing by interposing a first brake therebetween, and a sixth rotational element selectively connected with the transmission housing by interposing a second brake therebetween, wherein a first clutch selectively connects at least two rotational elements of the fourth, fifth, and sixth rotational elements, and/or a third planetary gear set that is a compound planetary gear set combined by a single pinion planetary gear set and a double pinion planetary gear set, and includes a seventh rotational element directly connected with the sixth rotational element, an eighth rotational element selectively connected with the input shaft by interposing a second clutch therebetween and selectively connected with the transmission housing by interposing a third brake therebetween, a ninth rotational element connected with an output shaft, and a tenth rotational element connected with the fourth rotational element by interposing a third clutch therebetween, wherein a fourth clutch is disposed between the seventh rotational element and the eighth rotational element.

The first planetary gear set may be a single pinion planetary gear set, the first rotational element is a first sun gear, the second rotational element is a first planet carrier, and the third rotational element is a first ring gear, the second planetary gear set is a single pinion planetary gear set, the fourth rotational element is a second sun gear, the fifth rotational element is a second planet carrier, and the sixth rotational element is a second ring gear, and/or the third planetary gear set includes the seventh rotational element that is a third sun gear engaged with a long pinion, the eighth rotational element that is a third planet carrier, the ninth rotational element that is a third ring gear, and the tenth rotational element that is a fourth sun gear engaged with a short pinion.

The first clutch may be disposed between the fifth rotational element and the sixth rotational element.

The first clutch may be disposed between the fourth rotational element and the fifth rotational element.

The first clutch may be disposed between the fourth rotational element and the sixth rotational element.

The gear train of an automatic transmission for a vehicle may include the first planetary gear set is a single pinion planetary gear set, the first rotational element is a first sun gear, the second rotational element is a first planet carrier, and the third rotational element is a first ring gear, the second planetary gear set is a double pinion planetary gear set, the fourth rotational element is a second sun gear, the fifth rotational element is a second ring gear, and the sixth rotational element is a second planet carrier, and/or the third planetary gear set includes the seventh rotational element that is a third sun gear engaged with a long pinion, the eighth rotational element that is a third planet carrier, the ninth rotational element that is a third ring gear, and the tenth rotational element that is a fourth sun gear engaged with a short pinion.

The first clutch may be disposed between the fifth rotational element and the sixth rotational element.

The first clutch may be disposed between the fourth rotational element and the fifth rotational element.

The first clutch may be disposed between the fourth rotational element and the sixth rotational element.

The gear train of an automatic transmission for a vehicle may include the first planetary gear set is a double pinion planetary gear set, the first rotational element is a first sun gear, the second rotational element is a first ring gear, and the third rotational element is a first planet carrier, the second planetary gear set is a single pinion planetary gear set, the fourth rotational element is a second sun gear, the fifth rotational element is a second planet carrier, and the sixth rotational element is a second ring gear, and/or the third planetary gear set includes the seventh rotational element that is a third sun gear engaged with a long pinion, the eighth rotational element that is a third planet carrier, the ninth rotational element that is a third ring gear, and the tenth rotational element that is a fourth sun gear engaged with a short pinion.

The first clutch may be disposed between the fifth rotational element and the sixth rotational element.

The first clutch may be disposed between the fourth rotational element and the fifth rotational element.

The first clutch may be disposed between the fourth rotational element and the sixth rotational element.

The gear train of an automatic transmission for a vehicle may include the first planetary gear set is a double pinion planetary gear set, the first rotational element is a first sun gear, the second rotational element is a first ring gear, and the third rotational element is a first planet carrier, the second planetary gear set is a double pinion planetary gear set, the fourth rotational element is a second sun gear, the fifth rotational element is a second ring gear, and the sixth rotational element is a second planet carrier, and/or the third planetary gear set includes the seventh rotational element that is a third sun gear engaged with a long pinion, the eighth rotational element that is a third planet carrier, the ninth rotational element that is a third ring gear, and the tenth rotational element that is a fourth sun gear engaged with a short pinion.

The first clutch may be disposed between the fifth rotational element and the sixth rotational element.

The first clutch may be disposed between the fourth rotational element and the fifth rotational element.

The first clutch may be disposed between the fourth rotational element and the sixth rotational element.

In another aspect of the present invention, a gear train of an automatic transmission for a vehicle may include a first planetary gear set that is a simple planetary gear set, and includes a first rotational element operating as a fixed element, a second rotational element outputting a reduced rotational speed, and a third rotational element directly connected with an input shaft and operating as an input element, a second planetary gear set that is a simple planetary gear set and includes a fourth rotational element directly connected with the second rotational element, a fifth rotational element selectively connected with a transmission housing by interposing a first brake therebetween, and a sixth rotational element selectively connected with a transmission housing by interposing a second brake therebetween, wherein a first clutch selectively connects at least two rotational elements of the fourth, fifth, and sixth rotational elements, and/or a third planetary gear set that is a compound planetary gear set combined by a single pinion planetary gear set and a double pinion planetary gear set, and includes a seventh rotational element directly connected with the sixth rotational element, an eighth rotational element selectively connected with the input shaft by interposing a second clutch therebetween and selectively connected with the transmission housing by interposing a third brake therebetween, a ninth rotational element connected with an output shaft, and a tenth rotational element connected with the fourth rotational element by interposing a third clutch therebetween, wherein a fourth clutch selectively connects at least two rotational elements of the seventh, eighth, ninth, and tenth rotational elements.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart of frictional members employed in a gear train according to the first exemplary embodiment of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
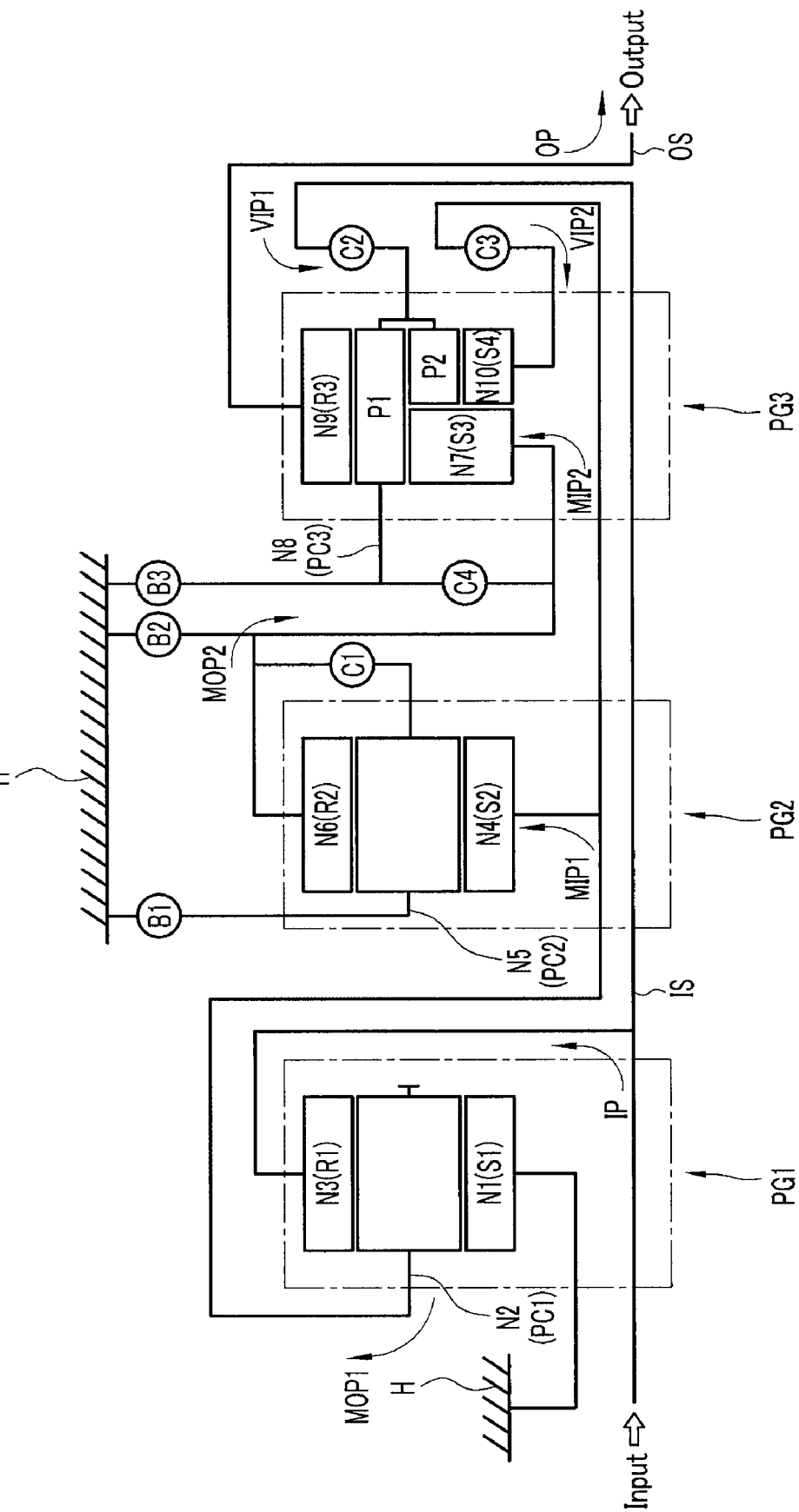
FIG. 1 is a schematic diagram of an exemplary gear train according to a first exemplary embodiment of the present invention.

As shown in FIG. 1, a gear train according to a first exemplary embodiment of the present invention includes first and second planetary gear sets PG1 and PG2 as simple planetary gear sets and a third planetary gear set PG3 as a compound planetary gear set that are disposed on the same shaft axis line, with four clutches C1, C2, C3, and C4 and three brakes B1, B2, and B3.

Rotational speed of an input shaft IS is changed via the first, second, and third planetary gear sets PG1, PG2, and PG3 and output through an output shaft OS. The first planetary gear set PG1 is disposed close to an engine and the second and third planetary gear sets PG2 and PG3 are sequentially disposed.

The input shaft IS is an input member and indicates a turbine shaft in a torque converter. The input shaft IS receives a converted engine torque from the torque converter and the output shaft OS, which is an output member, and outputs a drive torque to vehicle wheels through an output gear and a differential.

The first planetary gear set PG1 is a single pinion planetary gear set and includes a sun gear S1, a planet carrier PC1, and a ring gear R1 as three rotational elements.

The first sun gear S1 is fixedly connected to a transmission housing H and the first ring gear R1 is directly connected to the input shaft IS.

The first sun gear S1 is indicated as a first rotational element N1 and is fixedly connected to the transmission housing H so that the first sun gear S1 is operated as a fixed element. The first planet carrier PC1 is indicated as a second rotational element N2 and outputs a reduced rotational speed through a first intermediate output path MOP1. The first ring gear R1 is indicated as a third rotational element N3 and receives rotational speed of the input shaft IS through an input path IP.

The second planetary gear set PG2 is a single pinion planetary gear set and includes a second sun gear S2, a planet carrier PC2, and a second ring gear R2.

The second sun gear S2 is directly connected with the first planet carrier PC1, the second planet carrier PC2 is variably connected to the transmission housing H, and the second ring gear R2 is variably connected to the transmission housing H and operated as an output element.

The second sun gear S2 is indicated as a fourth rotational element N4 and connected with the first intermediate output path MOP1 though a first intermediate input path MIP1. The second planet carrier PC2 is indicated as a fifth rotational element N5, is variably connected to the transmission housing H, and selectively operated as a fixed element. The second ring gear R2 is indicated as a sixth rotational element N6, is variably connected to the transmission housing H through a second intermediate output path MOP2, and operated as a fixed element.

A first brake B1 is disposed between the fifth rotational element N5 (the second planet carrier PC2) and the transmission housing H, and a second brake B2 is disposed between the sixth rotational element N6 (the second ring gear R2) and the transmission housing H.

Two rotational elements of the three rotational elements of the second planetary gear set PG2 may be variably connected so that the second planetary gear set PG2 rotates as a whole.

For this purpose in the first exemplary embodiment of the present invention, as shown in FIG. 1, the first clutch C1 is disposed between the fifth rotational element N5 (the second planet carrier PC2) and the sixth rotational element N6 (the second ring gear R2).

In the case that the fourth rotational element N4 (the second sun gear S2) receives an input and the first clutch C1 operates, the second planetary gear set PG2 is locked and rotates as a whole.

The third planetary gear set PG3 of Ravingneaux type is combined by a single pinion planetary gear set and a double pinion planetary gear set, and a ring gear and a planet carrier commonly act for a large diameter sun gear and a small diameter sun gear.

The third planetary gear set PG3 includes a third ring gear R3, a third planet carrier PC3, a third sun gear S3 engaged with a long pinion P1 and a fourth sun gear S4 engaged with a short pinion P2.

The third sun gear S3 is directly connected with the second ring gear R2, the fourth sun gear S4 is variably connected with the second sun gear S2, the third planet carrier PC3 is variably connected with the input shaft IS and simultaneously variably connected with the transmission housing H, and the third ring gear R3 is directly connected to the output shaft OS.

The third sun gear S3 is indicated as a seventh rotational element N7 and directly connected with the second intermediate output path MOP2 of the fifth rotational element N5 through a second intermediate input path MIP2. The third planet carrier PC3 is indicated as an eighth rotational element N8, is variably connected with the input shaft IS through a first variable input path VIP1, and simultaneously operated as a fixed element by being selectively connected with the transmission housing H. The third ring gear R3 is indicated as a ninth rotational element N9 and connected with the output path OP. The fourth sun gear S4 is indicated as a tenth rotational element N10 and variably connected with the fourth rotational element N4 through a second variable input path VIP2.

The second clutch C2 is disposed between the input shaft IS and the eighth rotational element N8 and the third clutch C3 is disposed between the fourth rotational element N4 and the tenth rotational element N10.

The second brake B2 is disposed between the transmission housing H and the sixth rotational element N6 connected with the seventh rotational element N7 such that the sixth rotational element N6 and the seventh rotational element N7 can be selectively operated as fixed elements. The third brake B3 is disposed between the eighth rotational element N8 and the transmission housing H such that the eighth rotational element N8 can be selectively operated as a fixed element.

The fourth clutch C4 is disposed for the third planetary gear set PG3 to rotate as a whole, and in the exemplary embodiments of the present invention the fourth clutch C4 is disposed between the seventh rotational element N7 (the third sun gear S3) and the eighth rotational element N8 (the third planet carrier PC3).

In the drawings, while the fourth clutch C4 selectively connects the seventh rotational elements N7 and the eighth rotational element N8, it is not limited thereto, the fourth clutch C4 may selectively connects at least two rotational elements of the seventh, eighth, ninth, and tenth rotational elements N7, N8, N9 and N10.

With the scheme as described above, the rotational speed of the input shaft IS is transmitted to the first, second, and third planetary gear sets PG1, PG2, and PG3, is changed into one of the ten forward speeds and one reverse speed and output through the output path OP of the output shaft OS.

The first, second, third, and fourth clutches C1, C2, C3, and C4 and the first, second, and third brakes B1, B2, and B3 can be enabled as multi-plate hydraulic pressure friction devices that are frictionally engaged by hydraulic pressure.

In the first exemplary embodiment of the present invention, the first brake B1 is arranged forward of the second planetary gear set PG2, the first clutch C1, the fourth clutch C4, and the second and third brakes B2 and B3 are arranged between the second and third planetary gear sets PG2 and PG3, and the second and third clutches C2 and C3 are arranged rearward of the third planetary gear set PG3.

As described above, the friction members are dispersedly disposed so that hydraulic lines for supplying hydraulic pressure to the friction members can be easily formed and also distribution of weight can be uniform so that total weight balance can be enhanced.

FIG. 2 is an operational chart of frictional members employed in a gear train according to the exemplary embodiment of the present invention. As shown in FIG. 2, two friction elements are operated in each shift range.

The first brake B1 and the third brake B3 are operated in the first forward speed.

The third clutch C3 and the third brake B3 are operated in the second forward speed.

The third clutch C3 and the first brake B1 are operated in the third forward speed.

The third clutch C3 and the second brake B2 are operated in the fourth forward speed.

The third clutch C3 and the fourth clutch C4 are operated in the fifth forward speed.

The second clutch C2 and the third clutch C3 are operated in the sixth forward speed.

The second clutch C2 and the fourth clutch C4 are operated in the seventh forward speed.

The first clutch C1 and the second clutch C2 are operated in the eighth forward speed.

The second clutch C2 and the second brake B2 are operated in the ninth forward speed.

The second clutch C2 and the first brake B1 are operated in the tenth forward speed.

The first clutch C1 and the third brake B3 are operated in the reverse speed.

Figure 3:
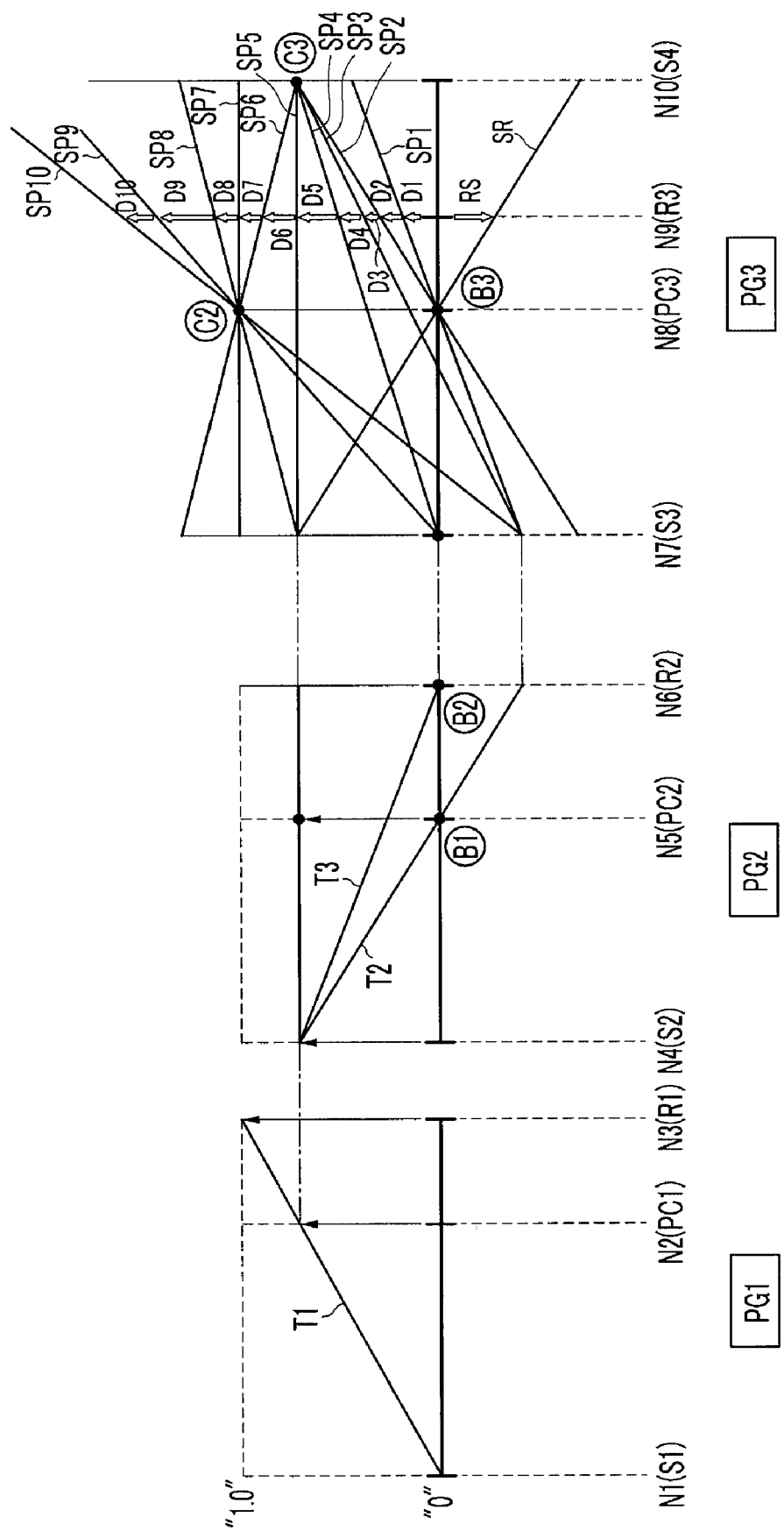
FIG. 3 is a speed diagram of a gear train according to the first exemplary embodiment of the present invention.

FIG. 3 is a lever diagram of a gear train according to the first exemplary embodiment of the present invention. In FIG. 3, a lower horizontal line represents "0" rotational speed, and an upper horizontal line represents "1.0" rotational speed, which is the same as the rotational speed of the input shaft IS.

Three vertical lines of the first planetary gear set PG1 respectively represent the first rotational member N1 (the first ring gear R1), the second rotational member N2 (the first planet carrier PC1), and the third rotational member N3 (the first sun gear S1) sequentially from the left in the drawing, and a distance between them is determined according to a gear ratio (teeth number of sun gear/teeth number of ring gear) of the first planetary gear set PG1.

Three vertical lines of the second planetary gear set PG2 respectively represent the fourth rotational member N4 (the second sun gear S2), the fifth rotational member N5 (the second planet carrier PC2), and the sixth rotational member N6 (the second ring gear R2) sequentially from the left in the drawing, and a distance between them is determined according to a gear ratio (teeth number of sun gear/teeth number of ring gear) of the second planetary gear set PG2.

Four vertical lines of the third planetary gear set PG3 respectively represent the seventh rotational member N7 (the third sun gear S3), the eighth rotational member N8 (the third planet carrier PC3), the ninth rotational member N9 (the third ring gear R3), and the tenth rotational member N10 (the fourth sun gear S4) sequentially from the left in the drawing, and a distance between them is determined according to a gear ratio (teeth number of sun gear/teeth number of ring gear) of the third planetary gear set PG3.

Determining position of the rotational elements is obvious to a person skilled in the art so a detailed explanation will be omitted.

First Forward Speed

In the first forward speed, as shown in FIG. 2, the first and third brakes B1 and B3 are operated.

As shown in FIG. 3, input is performed through the third rotational element N3 connected with the input path IP, the first rotational element N1 is operated as a fixed element, and so the first speed line T1 is formed and the second rotational element N2 outputs a reduced speed through the first intermediate output path MOP1.

The rotational speed of the first intermediate output path MOP1 is transmitted to the second planetary gear set PG2 though the first intermediate input path MIP1 and the fourth rotational element N4, the fifth rotational element N5 is operated as a fixed element by operation of the first brake B1, such that a second speed line T2 is formed and a reverse rotational speed is output through the sixth rotational element N6 and the second intermediate output path MOP2.

The reverse rotational speed of the second intermediate output path MOP2 is transmitted to the third planetary gear set PG3 through the second intermediate input path MIP2, the seventh rotational element N7 and the eighth rotational element N8 are operated as a fixed element by an operation of the third brake B3, and so a first forward speed line SP1 is formed. Thus, the final output speed of the gear train becomes a height D1 of the first forward speed line SP1 at the position of the ninth operational element N9, and thus the first forward speed shifting is realized. Herein, a speed ratio (rotation speed of an input member/rotation speed of an output member) as a maximum speed ratio of about 4.859 is realized.

Thus, the first planetary gear set PG1 receives the rotational speed of the input shaft IS via the input path IP and outputs a reduced rotational speed through the first intermediate output path MOP1, the reduced rotational speed is transmitted to the second planetary gear set PG2 through the first intermediate input path MIP1, the reversed rotational speed is transmitted to the third planetary gear set PG3 through the second intermediate output path MOP2 and the second intermediate input path MIP2, and the third planetary gear set PG3 outputs a shifted rotational speed through the output path OP so that the first forward speed shifting is realized.

Second Forward Speed

In the second forward speed, the first brake B1, which is operated in the first forward speed, is released and the third clutch C3 is operated.

Then, input is performed through the third rotational element N3 connected with the input path IP, the first rotational element N1 is operated as a fixed element, and so the first speed line T1 is formed and the second rotational element N2 outputs a reduced speed through the first intermediate output path MOP1.

The rotational speed of the first intermediate output path MOP1 is transmitted to the second planetary gear set PG2 though the first intermediate input path MIP1 and the fourth rotational element N4, and simultaneously transmitted to the third planetary gear set PG3 through the second variable input path VIP2 and the tenth rotational element N10 by an operation of the third clutch C3.

The second planetary gear set PG2 rotates without effect on speed shifting, the eighth operational element N8 is operated as a fixed element by an operation of the third brake B3, and so a second forward speed line SP2 is formed. Thus, the final output speed of the gear train becomes a height D2 of the second forward speed line SP2 at the position of the ninth rotational element N9, and thus the second forward speed shifting is realized. Herein, a speed ratio of about 3.179 is realized.

Thus, the first planetary gear set PG1 receives the rotational speed of the input shaft IS via the input path IP and outputs a reduced rotational speed through the first intermediate output path MOP1, and the third planetary gear set PG3 receives the reduced rotational speed through the second variable input path VIP2 and outputs a changed rotational speed through the output path OP so that the second forward speed shifting is realized.

Third Forward Speed

In the third forward speed, the third brake B3, which is operated in the second forward speed, is released and the first brake B1 is operated.

Then, input is performed through the third rotational element N3 connected with the input path IP, the first rotational element N1 is operated as a fixed element, and so the first speed line T1 is formed and the second rotational element N2 outputs a reduced speed through the first intermediate output path MOP1.

The rotational speed of the first intermediate output path MOP1 is transmitted to the second planetary gear set PG2 though the first intermediate input path MIP1 and the fourth rotational element N4, a second speed line T2 is formed by an operation of the first brake B1, and a reversed rotational speed is output through the sixth rotational element N6 and the second intermediate output path MOP2.

The reversed rotational speed of the second intermediate output path MOP2 is transmitted to the third planetary gear set PG3 through the second intermediate input path MIP2 and the seventh rotational element N7, and simultaneously the reduced rotational speed of the first intermediate output path MOP1 is transmitted to the tenth rotational element N10 via the second variable input path VIP2 by an operation of the third clutch C3. Thus, the final output speed of the gear train becomes a height D3 of the third forward speed line SP3 at the position of the ninth rotational element N9, and thus the third forward speed shifting is realized. Herein, a speed ratio of about 2.647 is realized.

That is, the first planetary gear set PG1 receives the rotational speed of the input shaft IS via the input path IP and outputs a reduced rotational speed through the first intermediate output path MOP1, and the reduced rotational speed is transmitted to the second planetary gear set PG2 through the first intermediate input path MIP1, and the reverse rotational speed is transmitted to the third planetary gear set PG3 through the second intermediate output path MOP2 and the second intermediate input path MIP2. Simultaneously the reduced rotational speed of the first intermediate output path MOP1 is transmitted to the tenth rotational element N10 via the second variable input path VIP2 by an operation of the third clutch C3, and thus the third forward speed shifting is realized.

Fourth Forward Speed

In the fourth forward speed, as shown in FIG. 2, the first brake B1, which is operated in the third forward speed, is released and the second brake B2 is operated.

Then, input is performed through the third rotational element N3 connected with the input path IP, the first rotational element N1 is operated as a fixed element, and so the first speed line T1 is formed and the second rotational element N2 outputs a reduced speed through the first intermediate output path MOP1.

The rotational speed of the first intermediate output path MOP1 is transmitted to the second planetary gear set PG2 though the first intermediate input path MIP1 and the fourth rotational element N4, and simultaneously transmitted to the third planetary gear set PG3 through the second variable input path VIP2 and the tenth rotational element N10 by an operation of the third clutch C3.

In the second planetary gear set PG2, the fourth rotational element N4 receives the rotational speed of the first intermediate output path MOP1, the sixth rotational element N6 is operated as a fixed element by an operation of the second brake B2, and so the third speed line T3 is formed.

In the third planetary gear set PG3, the tenth rotational element N10 receives the rotational speed of the first intermediate output path MOP1, the sixth rotational element N6 and the seventh rotational element N7 are operated as fixed elements by an operation of the second brake B2, and so the fourth forward speed line SP4 is formed. Thus, the final output speed of the gear train becomes a height D4 of the fourth forward speed line SP4 at the position of the ninth rotational element N9, and thus the fourth forward speed shifting is realized. Herein, a speed ratio of about 2.010 is realized.

That is, the first planetary gear set PG1 receives the rotational speed of the input shaft IS via the input path IP and outputs a reduced rotational speed through the first intermediate output path MOP1, and the third planetary gear set PG3 receives the reduced rotational speed through the second variable input path VIP2 and outputs a changed rotational speed through the output path OP so that the fourth forward speed shifting is realized.

Fifth Forward Speed

In the fifth forward speed, as shown in FIG. 2, the second brake B2 operated in the fourth forward speed is released and the fourth clutch C4 is operated.

Then, input is performed through the third rotational element N3 connected with the input path IP, the first rotational element N1 is operated as a fixed element, and so the first speed line T1 is formed and the second rotational element N2 outputs a reduced speed through the first intermediate output path MOP1.

The rotational speed of the first intermediate output path MOP1 is transmitted to the second planetary gear set PG2 though the first intermediate input path MIP1 and the fourth rotational element N4, and simultaneously transmitted to the third planetary gear set PG3 through the second variable input path VIP2 and the tenth rotational element N10 by an operation of the third clutch C3.

The third planetary gear set PG3 rotates as a whole by an operation of the fourth clutch C4, and so a fifth forward speed line SP5 is formed. Thus, the final output speed of the gear train becomes a height D5 of the fifth forward speed line SP5 at the position of the ninth operational element N9, and thus the fifth forward speed shifting is realized. Herein, a speed ratio (rotation speed of an input member/rotation speed of an output member) of about 1.540 is realized.

That is, the first planetary gear set PG1 receives the rotational speed of the input shaft IS via the input path IP and outputs a reduced rotational speed through the first intermediate output path MOP1, and the third planetary gear set PG3 receives the reduced rotational speed through the second variable input path VIP2, rotates as a whole, and outputs a rotational speed through the output path OP so that the fifth forward speed shifting is realized.

Sixth Forward Speed

In the sixth forward speed, as shown in FIG. 2, the fourth clutch C4, which is operated in the fifth forward speed, is released and the second clutch C2 is operated.

Then, input is performed through the third rotational element N3 connected with the input path IP, the first rotational element N1 is operated as a fixed element, and so the first speed line T1 is formed and the second rotational element N2 outputs a reduced speed through the first intermediate output path MOP1.

The rotational speed of the first intermediate output path MOP1 is transmitted to the second planetary gear set PG2 though the first intermediate input path MIP1 and the fourth rotational element N4, and simultaneously transmitted to the third planetary gear set PG3 through the second variable input path VIP2 and the tenth rotational element N10 by an operation of the third clutch C3.

In the third planetary gear set PG3, the eighth rotational element N8 receives the rotational speed of the input shaft IS through the first variable input path VIP1 by an operation of the second clutch C2, and so a sixth forward speed line SP6 is formed. Thus, the final output speed of the gear train becomes a height D6 of the sixth forward speed line SP6 at the position of the ninth operational element N9, and thus the sixth forward speed shifting is realized. Herein, a speed ratio (rotation speed of an input member/rotation speed of an output member) of about 1.205 is realized.

That is, the first planetary gear set PG1 receives the rotational speed of the input shaft IS via the input path IP and outputs a reduced rotational speed through the first intermediate output path MOP1, and the third planetary gear set PG3 receives the reduced rotational speed through the second variable input path VIP2 and the rotational speed of the input shaft IS through the first variable input path VIP1 and outputs a rotational speed through the output path OP so that the sixth forward speed shifting is realized.

Seventh Forward Speed

In the seventh forward speed, as shown in FIG. 2, the third clutch C3, which is operated in the sixth forward speed, is released and the fourth clutch C4 is operated.

The third planetary gear set PG3 receives the rotational speed of the input shaft IS through the first variable input path VIP1 by an operation of the second clutch C2 and rotates as whole by an operation of the fourth clutch C4, and so a seventh forward speed line SP7 is formed. Thus, the final output speed of the gear train becomes a height D7 of the seventh forward speed line SP7 at the position of the ninth operational element N9, and thus the seventh forward speed shifting is realized. Herein, a speed ratio (rotation speed of an input member/rotation speed of an output member) of about 1.000 is realized.

That is, the third planetary gear set PG3 rotates as whole by an operation of the fourth clutch C4, and the rotational speed of the input shaft IS received from the first variable input path VIP1 is output through the output path OP so that the seventh forward speed shifting is realized.

Eighth Forward Speed

In the eighth forward speed, as shown in FIG. 2, the fourth clutch C4, which is operated in the seventh forward, speed is released and the first clutch C1 is operated.

Then, input is performed through the third rotational element N3 connected with the input path IP, the first rotational element N1 is operated as a fixed element, and so the first speed line T1 is formed and the second rotational element N2 outputs a reduced speed through the first intermediate output path MOP1.

The rotational speed of the first intermediate output path MOP1 is transmitted to the second planetary gear set PG2 though the first intermediate input path MIP1 and the fourth rotational element N4, and the second planetary gear set PG2 rotates as a whole by an operation of the first clutch C1 so that the rotational speed of the first intermediate output path MOP1 is transmitted to the seventh rotational element N7 via the second intermediate output path MOP2 and the second intermediate input path MIP2.

In the third planetary gear set PG3, the rotational speed of the input shaft IS is transmitted to the eighth operational element N8 by an operation of the second clutch C2, and so an eighth forward speed line SP8 is formed. Thus, the final output speed of the gear train becomes a height D8 of the eighth forward speed line SP8 at the position of the ninth operational element N9, and thus the eighth forward speed shifting is realized. Herein, a speed ratio (rotation speed of an input member/rotation speed of an output member) of about 0.876 is realized.

That is, the first planetary gear set PG1 receives the rotational speed of the input shaft IS via the input path IP and outputs a reduced rotational speed through the first intermediate output path MOP1, the second planetary gear set PG2 rotates as a whole by an operation of the first clutch C1, the third planetary gear set PG3 receives the rotational speed of the second intermediate output path MOP2 and the first variable input path VIP1 simultaneously so that the eighth forward speed shifting is realized.

Ninth Forward Speed

In the ninth forward speed, as shown in FIG. 2, the first clutch C1, which is operated in the eighth forward speed, is released and the second brake B2 is operated.

Then, input is performed through the third rotational element N3 connected with the input path IP, the first rotational element N1 is operated as a fixed element, and so the first speed line T1 is formed and the second rotational element N2 outputs a reduced speed through the first intermediate output path MOP1.

The rotational speed of the first intermediate output path MOP1 is transmitted to the second planetary gear set PG2 though the first intermediate input path MIP1 and the fourth rotational element N4, and the sixth rotational element N6 is operated as a fixed element by an operation of the second brake B2, and so the third speed line T3 is formed.

In the third planetary gear set PG3, the eighth rotational element N8 receives the rotational speed of the input shaft IS through the first variable input path VIP I by an operation of the second clutch C2, and so a ninth forward speed line SP9 is formed. Thus, the final output speed of the gear train becomes a height D9 of the ninth forward speed line SP9 at the position of the ninth operational element N9, and thus the ninth forward speed shifting is realized. Herein, a speed ratio (rotation speed of an input member/rotation speed of an output member) of about 0.713 is realized.

That is, the third planetary gear set PG3 receives the rotational speed of the input shaft IS through the first variable input path VIP1 and outputs an increased rotational speed by an operation of the second brake B2, so that the ninth forward speed shifting is realized.

Tenth Forward Speed

In the tenth forward speed, as shown in FIG. 2, the second brake B2, which is operated in the ninth forward speed, is released and the first brake B1 is operated.

Then, input is performed through the third rotational element N3 connected with the input path IP, the first rotational element N1 is operated as a fixed element, and so the first speed line T1 is formed and the second rotational element N2 outputs a reduced speed through the first intermediate output path MOP1.

The rotational speed of the first intermediate output path MOP1 is transmitted to the second planetary gear set PG2 though the first intermediate input path MIP1 and the fourth rotational element N4, a second speed line T2 is formed by an operation of the first brake B1, and a reverse rotational speed is output through the sixth rotational element N6 and the second intermediate output path MOP2.

The rotational speed of the second intermediate output path MOP2 is transmitted to the third planetary gear set PG3 via the second intermediate input path MIP2 and the seventh rotational element N7, and the eighth rotational element N8 receives the rotational speed of the input shaft IS through the first variable input path VIP1 by an operation of the second clutch C2, and so a tenth forward speed line SP10 is formed. Thus, the final output speed of the gear train becomes a height D10 of the tenth forward speed line SP10 at the position of the ninth operational element N9, and thus the tenth forward speed shifting is realized. Herein, a speed ratio (rotation speed of an input member/rotation speed of an output member) of about 0.622 is realized.

That is, the third planetary gear set PG3 receives the rotational speed of the input shaft IS through the first variable input path VIP1 and a reversed rotational speed of the second intermediate output path MOP2, and outputs an increased rotational speed so that the tenth forward speed shifting is realized.

Reverse Speed

In the reverse speed, as shown in FIG. 2, the first clutch C1 and the third brake B3 are operated.

Then, input is performed through the third rotational element N3 connected with the input path IP, the first rotational element N1 is operated as a fixed element, and so the first speed line T1 is formed and the second rotational element N2 outputs a reduced speed through the first intermediate output path MOP1.

The rotational speed of the first intermediate output path MOP1 is transmitted to the second planetary gear set PG2 though the first intermediate input path MIP1 and the fourth rotational element N4, and the second planetary gear set PG2 rotates as a whole by an operation of the first clutch C1 so that the rotational speed of the first intermediate output path MOP1 is transmitted to the seventh rotational element N7 via the second intermediate output path MOP2 and the second intermediate input path MIP2.

The eighth operational element N8 is operated as a fixed element by an operation of the third brake B3, and so a reverse speed line SR is formed. Thus, the final output speed of the gear train becomes a height RS of the reverse speed line SR at the position of the ninth rotational element N9, and thus the reverse speed shifting is realized. Herein, a speed ratio of about 3.831 is realized.

That is, the first planetary gear set PG1 receives the rotational speed of the input shaft IS via the input path IP and outputs a reduced rotational speed through the first intermediate output path MOP1, the second planetary gear set PG2 rotates as a whole by an operation of the first clutch C1, the third planetary gear set PG3 receives the rotational speed of the second intermediate input path MIP2, and the eighth operational element N8 is operated as a fixed element by an operation of the third brake B3, so that the reverse speed shifting is realized.

Figure 4:
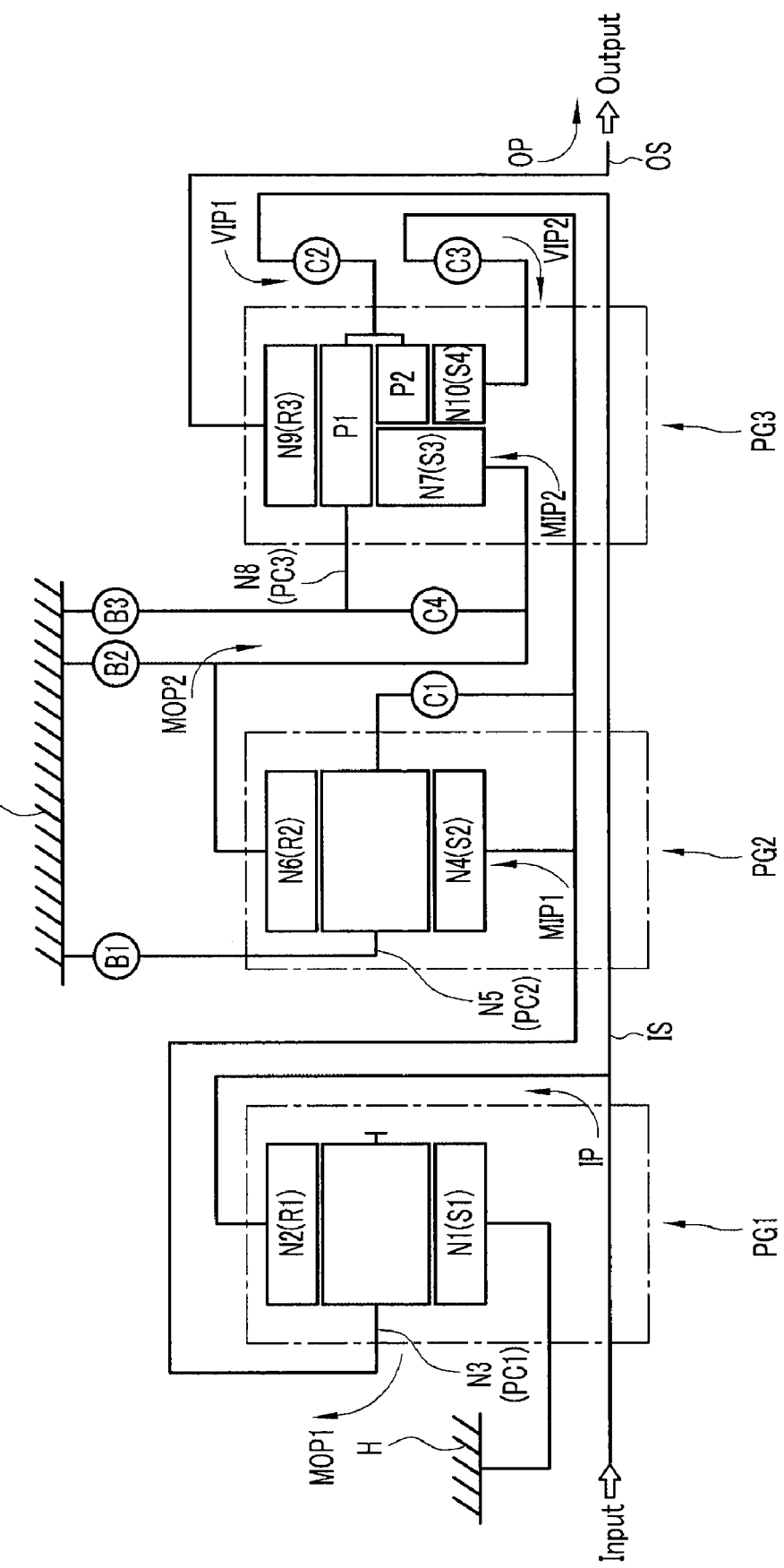
FIG. 4 is a schematic diagram of a gear train according to a second exemplary embodiment of the present invention.
Figure 5:
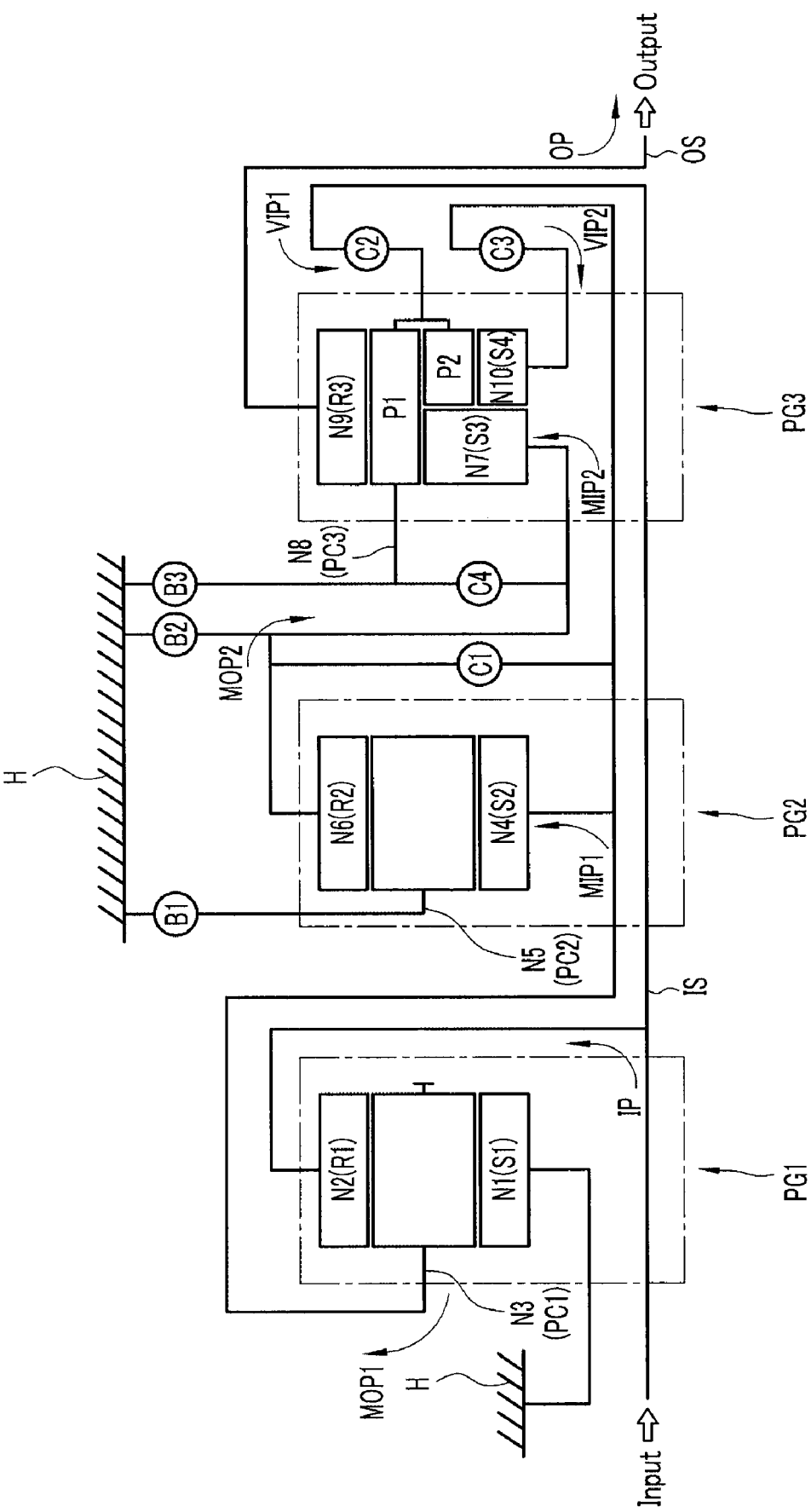
FIG. 5 is a schematic diagram of a gear train according to a third exemplary embodiment of the present invention.

FIG. 4 and FIG. 5 are schematic diagrams of a gear train according to second and third exemplary embodiments of the present invention. In the second and third exemplary embodiments of the present invention, the first clutch C1, which makes the second planetary gear set PG2 rotate as a whole, is differently arranged.

In the second exemplary embodiment, as shown in FIG. 4, the first clutch C1 is arranged between the fourth rotational element N4 (the second sun gear S2) and the fifth rotational element N5 (the second planet carrier PC2).

In the third exemplary embodiment, as shown in FIG. 5, the first clutch C1 is arranged between the fourth rotational element N4 (the second sun gear S2) and the sixth rotational element N6 (the second ring gear R2).

Except for positions of the first clutch C 1, operations of the friction elements, shifting operations, and so on of the second and third exemplary embodiments remain the same as those of the first exemplary embodiment, and so detailed descriptions will be omitted.

Figure 6:
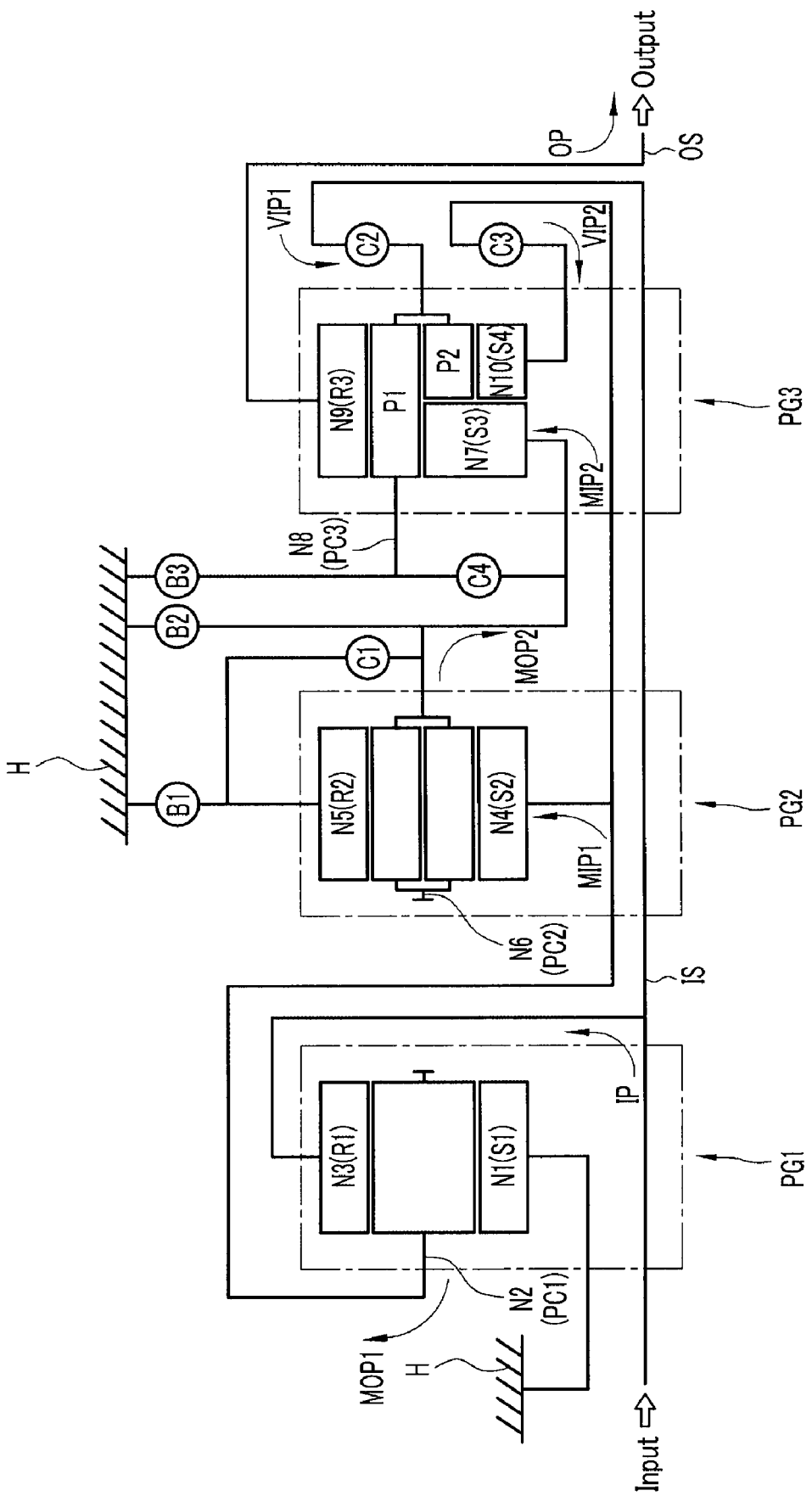
FIG. 6 is a schematic diagram of a gear train according to a fourth exemplary embodiment of the present invention.
Figure 7:
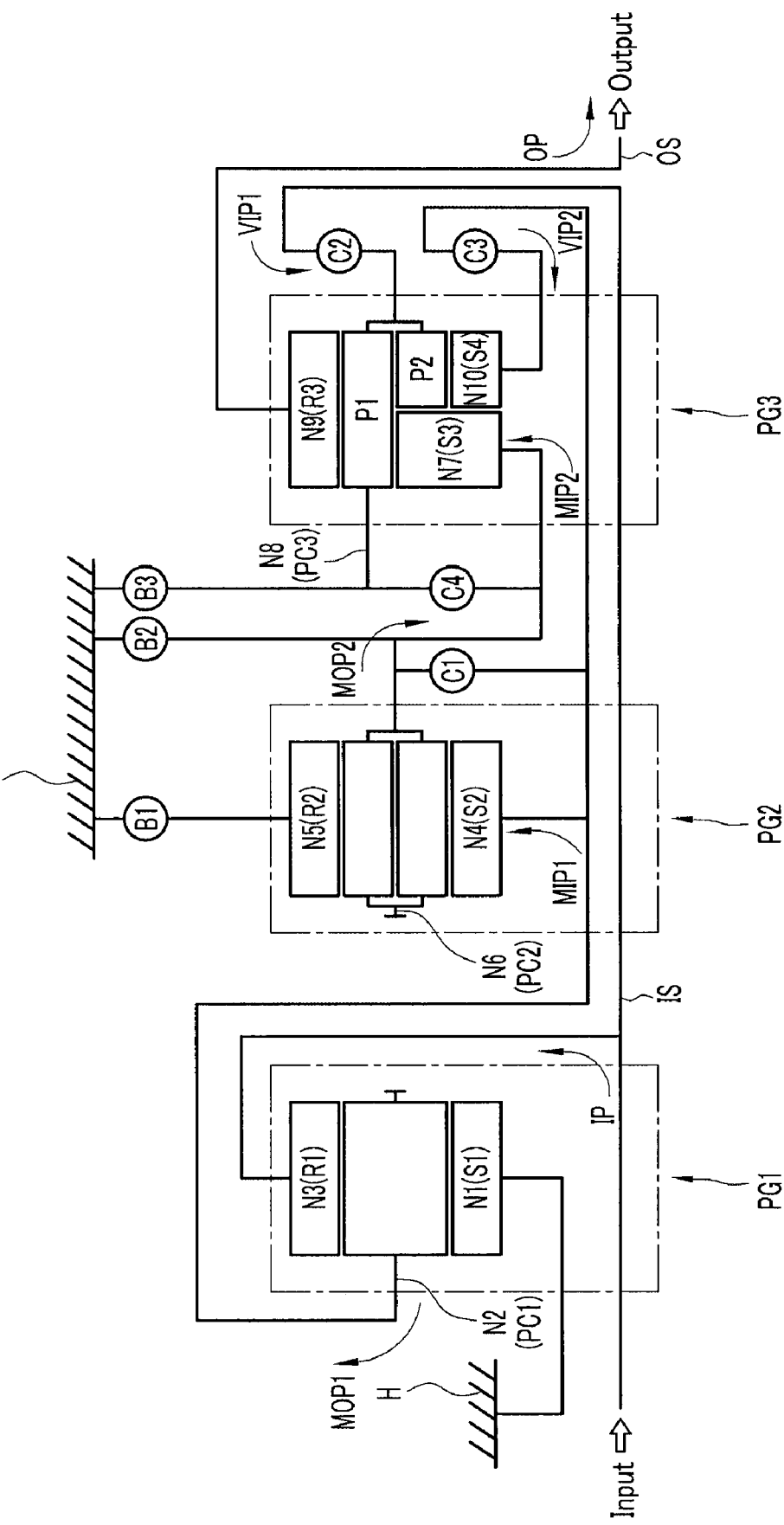
FIG. 7 is a schematic diagram of a gear train according to a fifth exemplary embodiment of the present invention.
Figure 8:
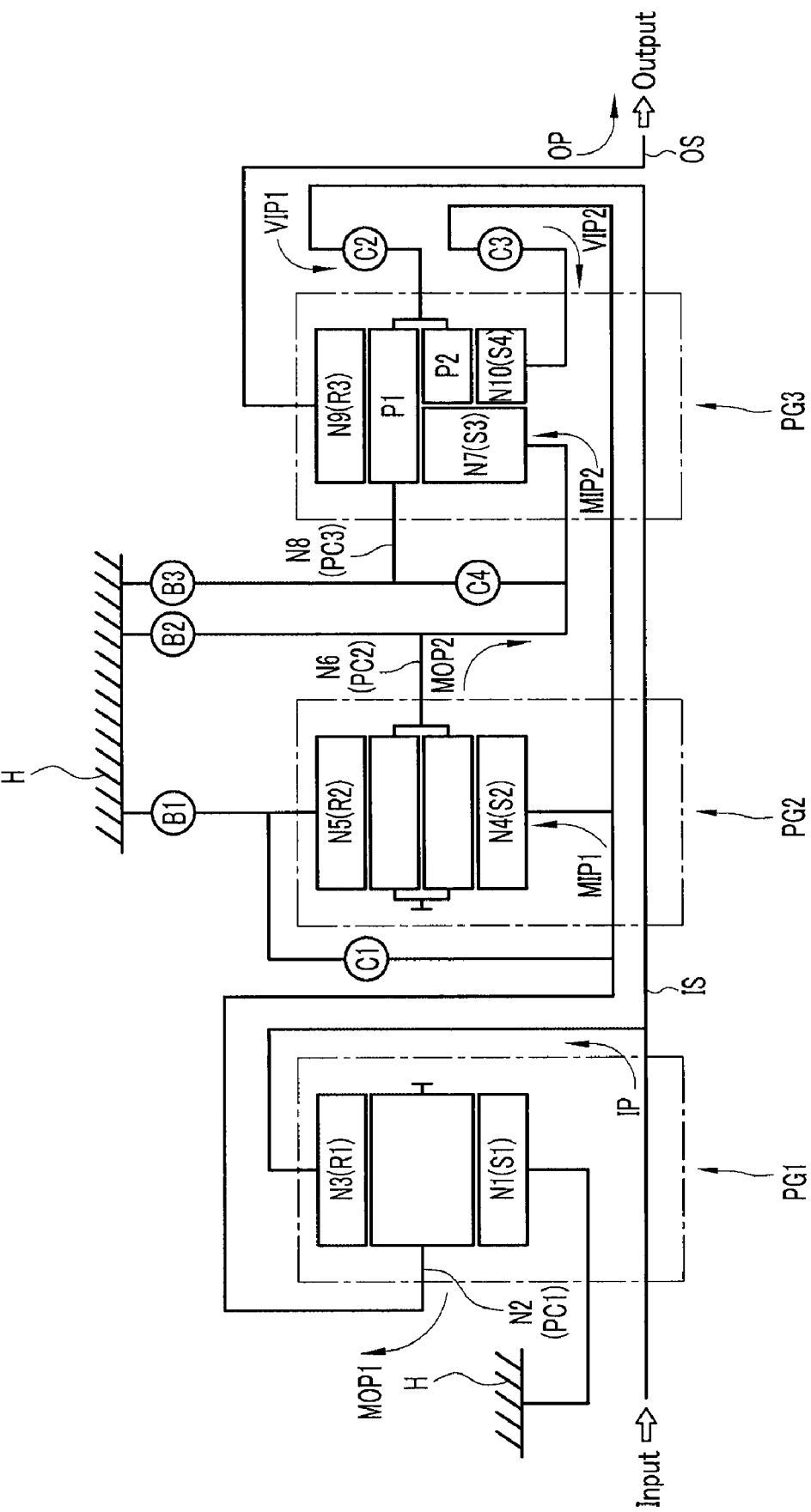
FIG. 8 is a schematic diagram of a gear train according to a sixth exemplary embodiment of the present invention.

FIG. 6, FIG. 7, and FIG. 8 are schematic diagrams of a gear train according to the fourth, fifth, and sixth exemplary embodiments of the present invention. In the fourth, fifth, and sixth exemplary embodiments, the first planetary gear set PG1 is a single pinion planetary gear set, however differently from the first exemplary embodiment, the second planetary gear set PG2 is a double pinion planetary gear set.

Thus, in the second planetary gear set PG2, the second ring gear R2 is indicated as the fifth rotational element N5 and the second planet carrier PC2 is indicated as the sixth rotational element N6.

In the fourth exemplary embodiment, as shown in FIG. 6, the first clutch C1 is disposed between the fifth rotational element N5 (the second ring gear R2) and the sixth rotational element N6 (the second planet carrier PC2. In the fifth exemplary embodiment, as shown in FIG. 7, the first clutch C1 is disposed between the fourth rotational element N4 (the second sun gear S2) and the sixth rotational element N6 (the second planet carrier PC2). In the sixth exemplary embodiment, as shown in FIG. 8, the first clutch C1 is disposed between the fourth rotational element N4 (the second sun gear S2) and the fifth rotational element N5 (the second ring gear R2).

Figure 9:
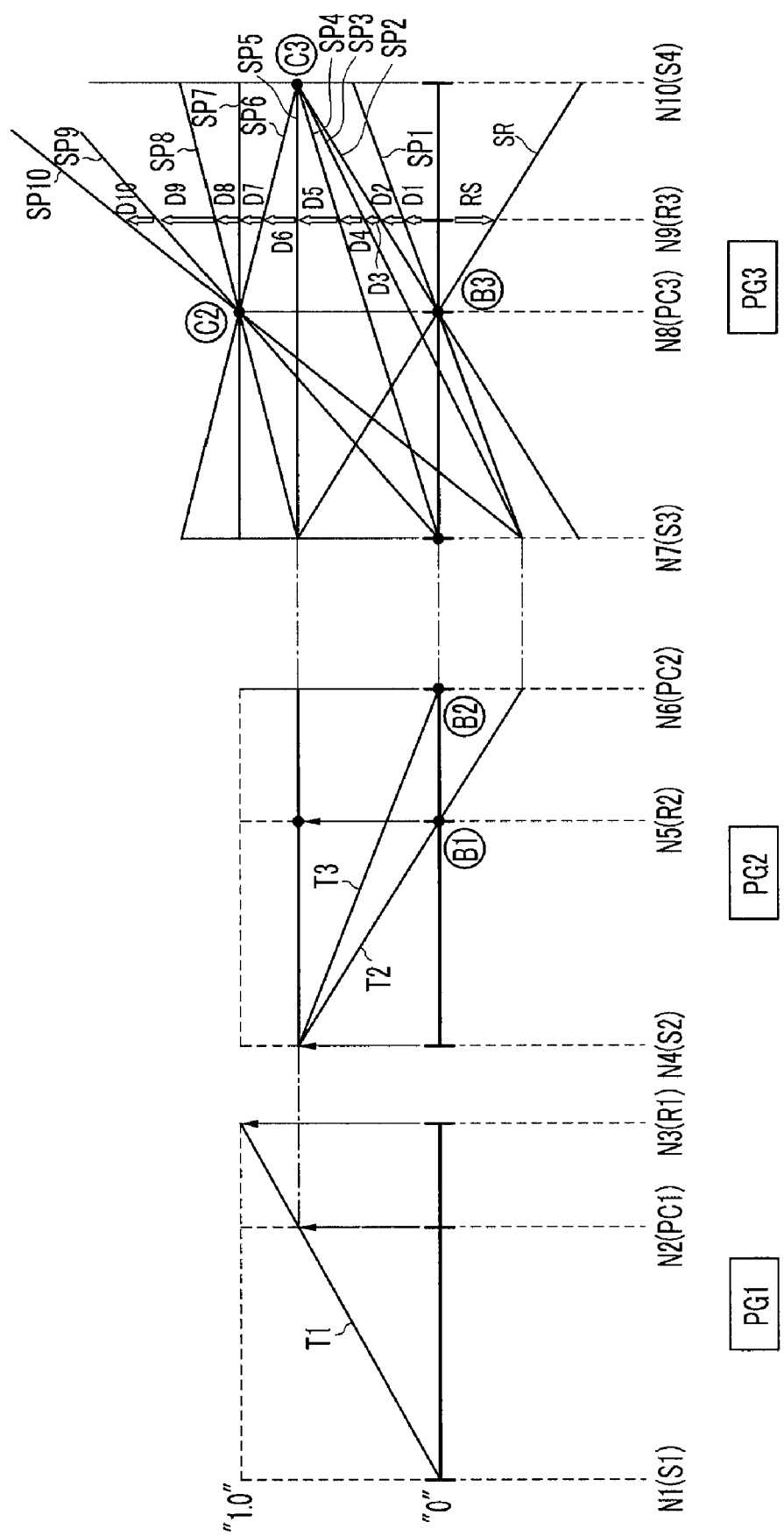
FIG. 9 is a speed diagram of a gear train according to the fourth, fifth, and sixth exemplary embodiments of the present invention.

Operations of the friction elements of the fourth, fifth, and sixth exemplary embodiments remain the same as those of the first exemplary embodiment as shown in FIG. 2. Also, shifting operations of the fourth, fifth, and sixth exemplary embodiments remain the same as those of the first exemplary embodiment except for the fifth and sixth rotational elements N5 and N6 as shown in FIG. 9 so that detailed descriptions of shifting operations will be omitted.

Figure 10:
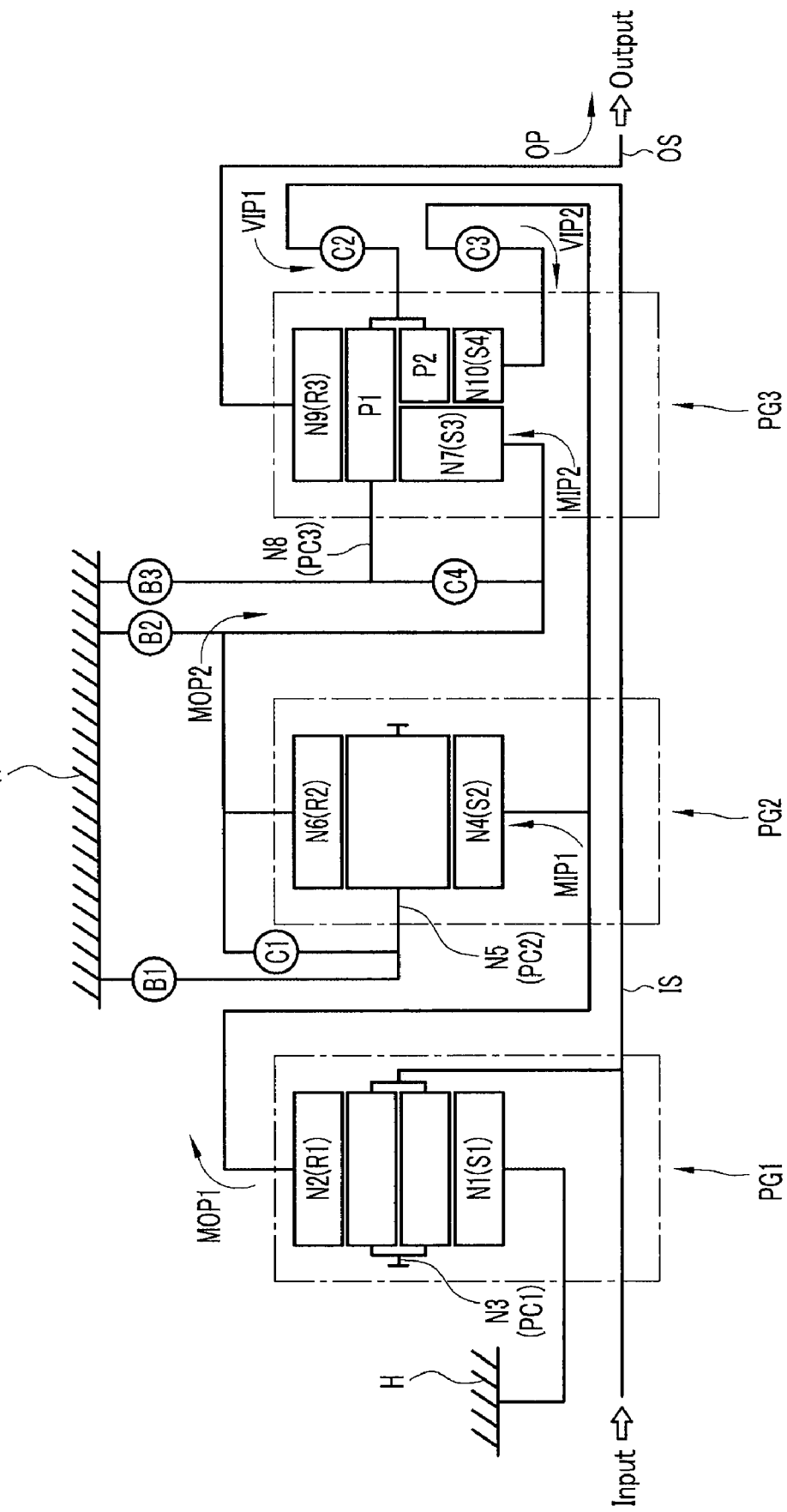
FIG. 10 is a schematic diagram of a gear train according to a seventh exemplary embodiment of the present invention.
Figure 11:
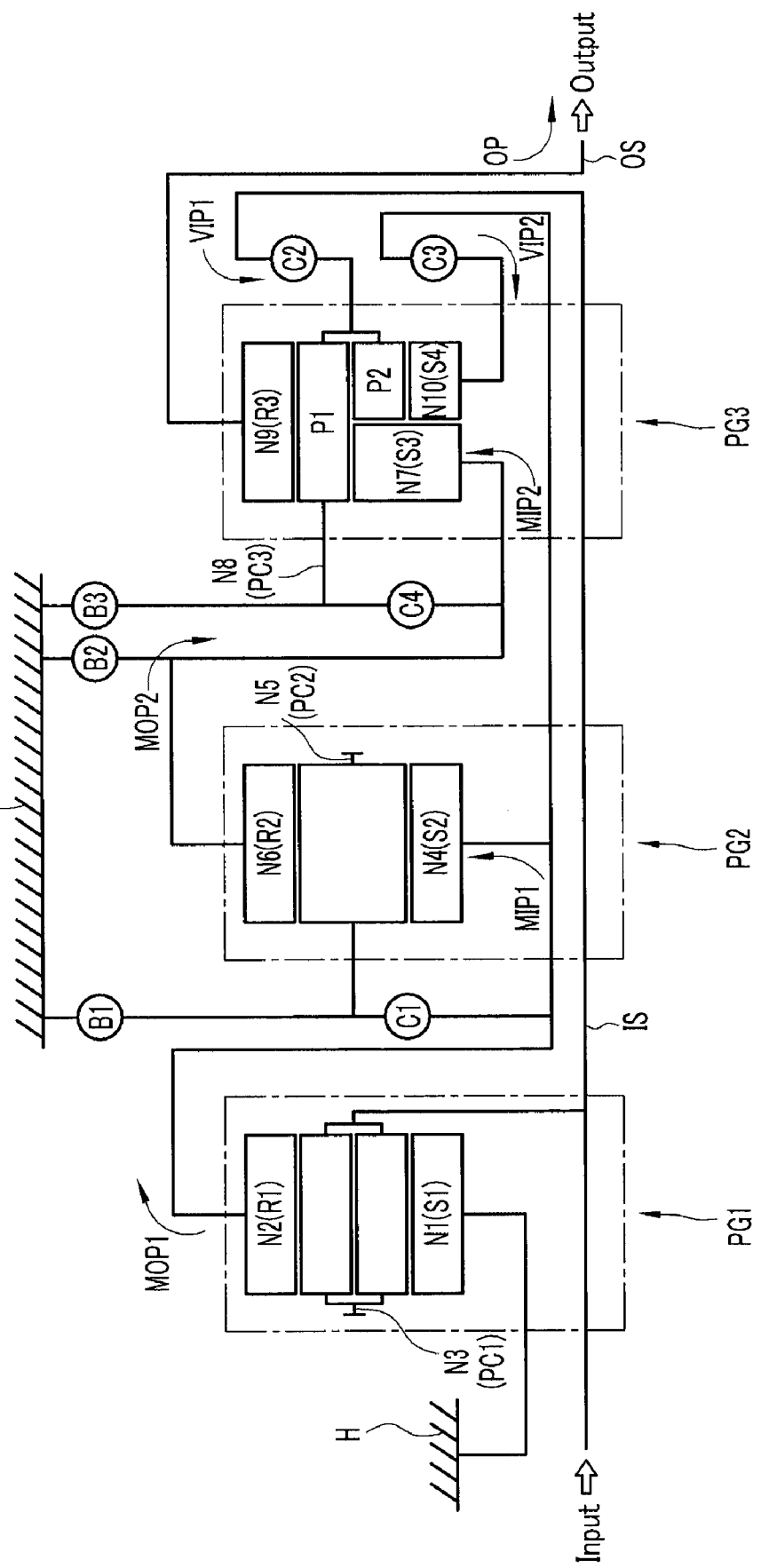
FIG. 11 is a schematic diagram of a gear train according to an eighth exemplary embodiment of the present invention.
Figure 12:
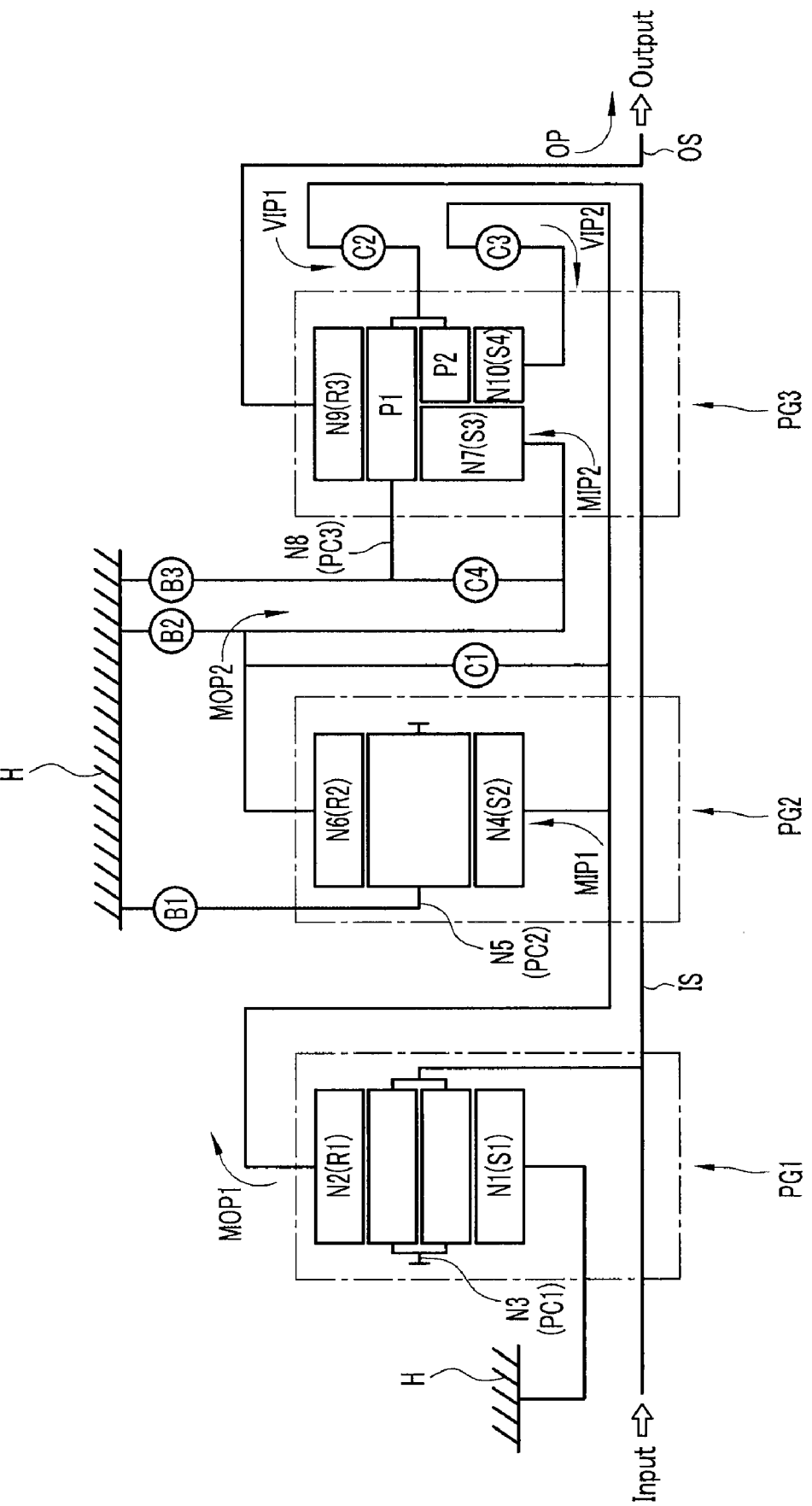
FIG. 12 is a schematic diagram of a gear train according to a ninth exemplary embodiment of the present invention.

FIG. 10, FIG. 11, and FIG. 12 are schematic diagrams of a gear train according to the seventh, eighth, and ninth exemplary embodiments of the present invention. In the seventh, eighth, and ninth exemplary embodiments, the second planetary gear set PG2 is a single pinion planetary gear set, however differently from the first exemplary embodiment, the first planetary gear set PG1 is a double pinion planetary gear set.

Thus, in the first planetary gear set PG1, the first ring gear R1 is indicated as the second rotational element N2 and the first planet carrier PC1 is indicated as the third rotational element N3.

In the seventh exemplary embodiment, as shown in FIG. 10, the first clutch C1 is disposed between the fifth rotational element N5 (the second planet carrier PC2) and the sixth rotational element N6 (the second ring gear R2). In the eighth exemplary embodiment, as shown in FIG. 11, the first clutch C1 is disposed between the fourth rotational element N4 (the second sun gear S2) and the fifth rotational element N5 (the second planet carrier PC2). In the ninth exemplary embodiment, as shown in FIG. 12, the first clutch C1 is disposed between the fourth rotational element N4 (the second sun gear S2) and the sixth rotational element N6 (the second ring gear R2).

Figure 13:
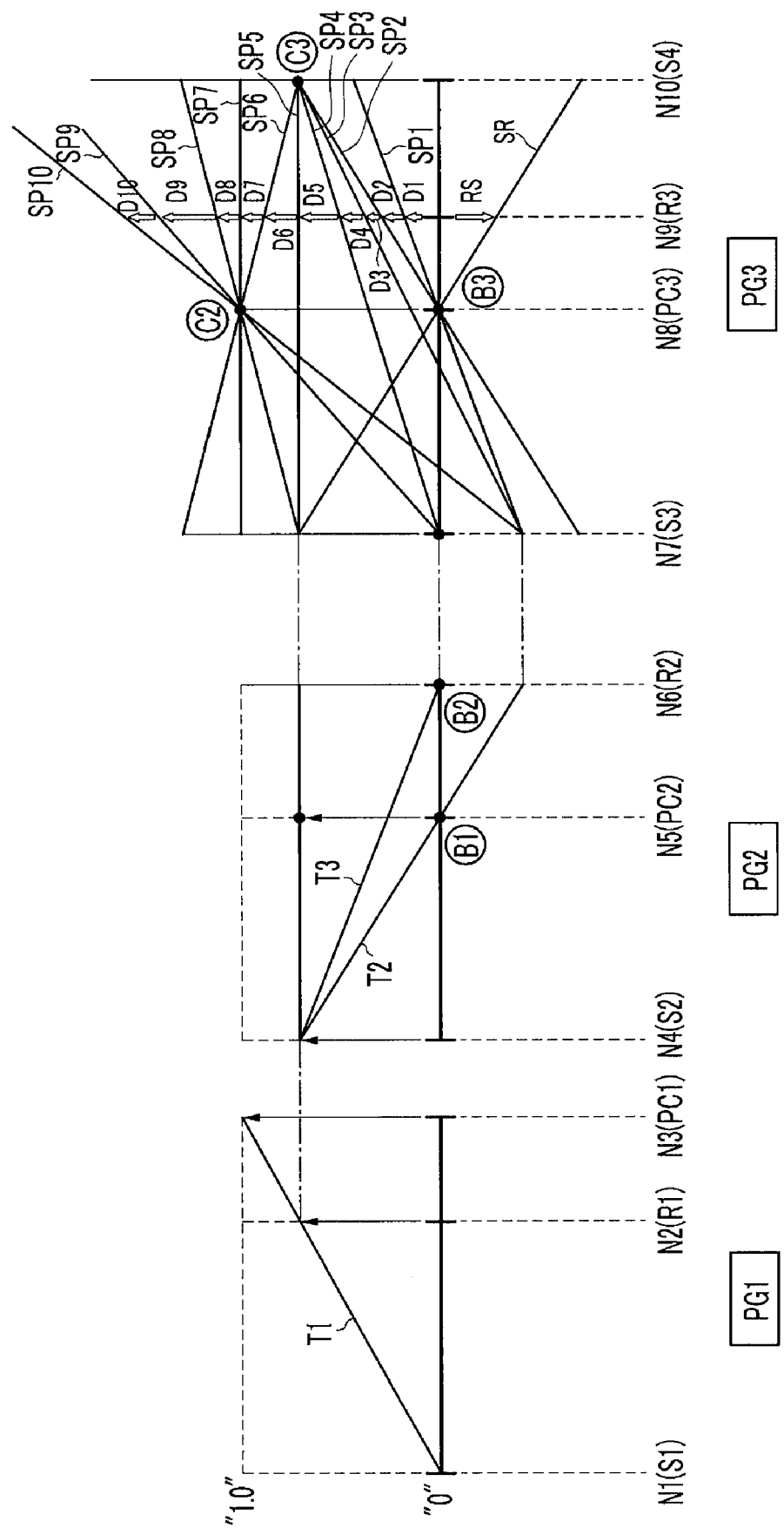
FIG. 13 is a speed diagram of a gear train according to the seventh, eighth, and ninth exemplary embodiments of the present invention.

Operations of the friction elements of the seventh, eighth, and ninth exemplary embodiments remain the same as those of the first exemplary embodiment as shown in FIG. 2. Also, shifting operations of the seventh, eighth, and ninth exemplary embodiments remain the same as those of the first exemplary embodiment except for second and third rotational elements N2 and N3, as shown in FIG. 13, and so detailed descriptions of shifting operations will be omitted.

Figure 14:
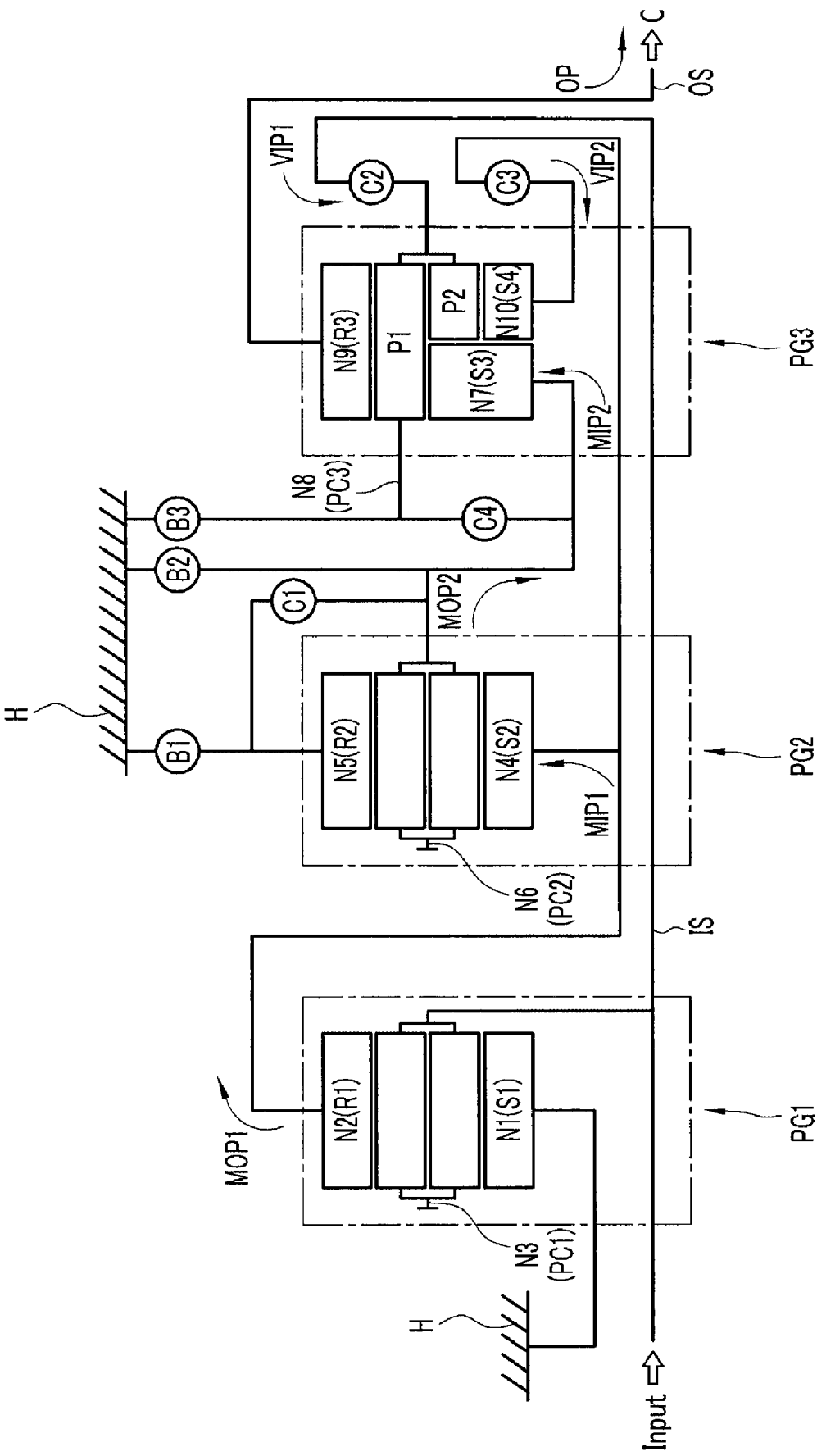
FIG. 14 is a schematic diagram of a gear train according to a tenth exemplary embodiment of the present invention.
Figure 15:
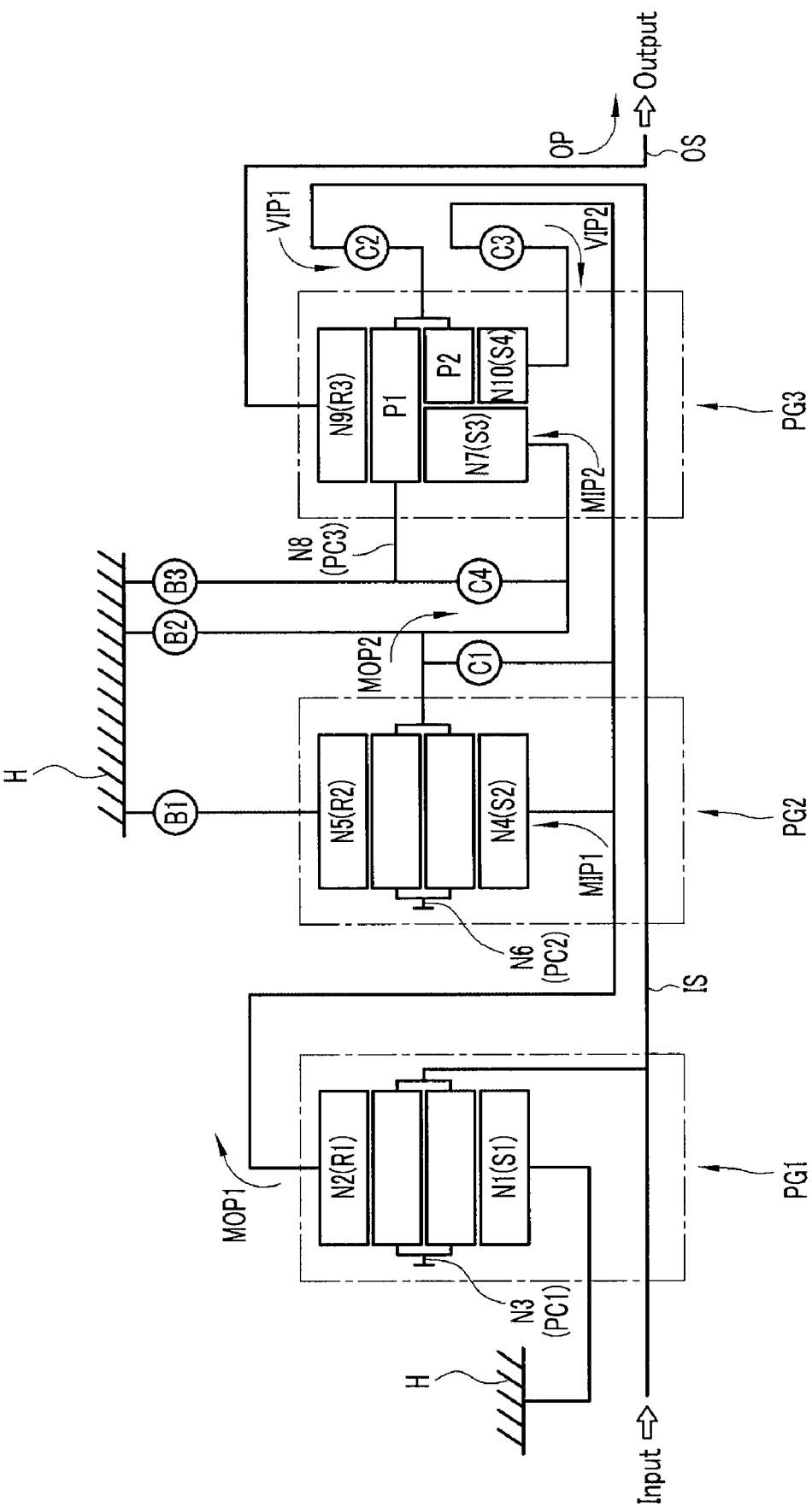
FIG. 15 is a schematic diagram of a gear train according to an eleventh exemplary embodiment of the present invention.
Figure 16:
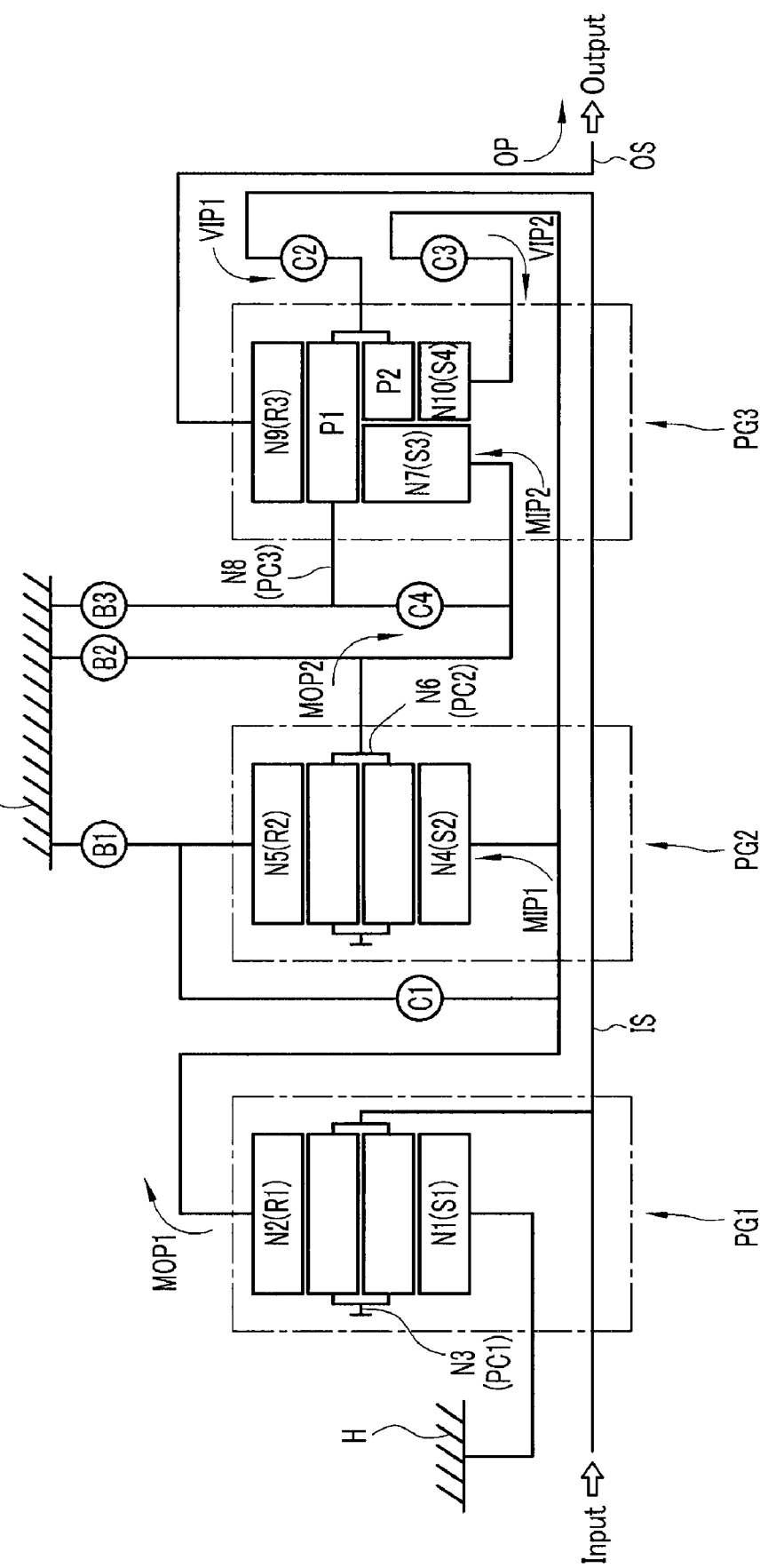
FIG. 16 is a schematic diagram of a gear train according to a twelfth exemplary embodiment of the present invention.

FIG. 14, FIG. 15, and FIG. 16 are schematic diagrams of a gear train according to the tenth, eleventh, and twelfth exemplary embodiments of the present invention. In the tenth, eleventh, and twelfth exemplary embodiments, differently from the first exemplary embodiment, the first and second planetary gear sets PG1 and PG2 are double pinion planetary gear sets.

Thus, in the first planetary gear set PG1, the first sun gear S1 is indicated as the first rotational element N1, the first ring gear R1 is indicated as the second rotational element N2, and the first planet carrier PC1 is indicated as the third rotational element N3. Also, in the second planetary gear set PG2, the second sun gear S2 is indicated as the fourth rotational element N4, the second ring gear R2 is indicated as the fifth rotational element N5, and the second planet carrier PC2 is indicated as the sixth rotational element N6.

In the tenth exemplary embodiment, as shown in FIG. 14, the first clutch C1 is disposed between the fifth rotational element N5 (the second ring gear R2) and the sixth rotational element N6 (the second planet carrier PC2). In the eleventh exemplary embodiment, as shown in FIG. 15, the first clutch C1 is disposed between the fourth rotational element N4 (the second sun gear S2) and the sixth rotational element N6 (the second planet carrier PC2). In the twelfth exemplary embodiment, as shown in FIG. 16, the first clutch C1 is disposed between the fourth rotational element N4 (the second sun gear S2) and the fifth rotational element N5 (the second ring gear R2).

Figure 17:
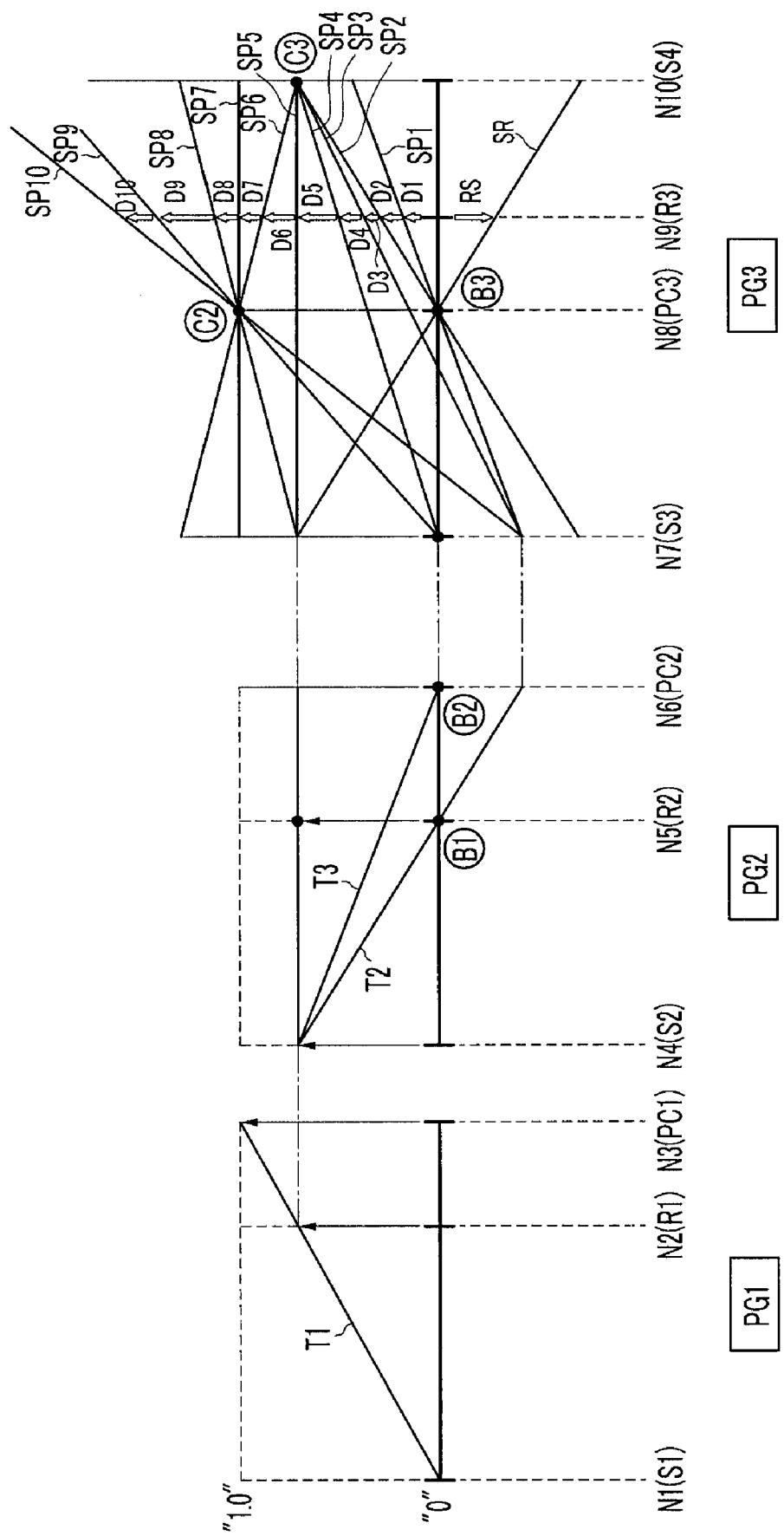
FIG. 17 is a speed diagram of a gear train according to the tenth, eleventh, and twelfth exemplary embodiments of the present invention.

Operations of the friction elements of the tenth, eleventh, and twelfth exemplary embodiments remain the same as those of the first exemplary embodiment as shown in FIG. 2. Also, shifting operations of the tenth, eleventh, and twelfth exemplary embodiments remain the same as those of the first exemplary embodiment except for the second and third rotational elements N2 and N3 and the fifth and sixth rotational elements N5 and N6, as shown in FIG. 17, and so detailed descriptions of shifting operations will be omitted.

In various aspects of the present invention, the gear train of an automatic transmission for a vehicle is composed of two simple planetary gear sets and one compound planetary gear set with four clutches and three brakes, and realizes ten forward speeds and one reverse speed.

Also, the number of friction elements can be minimized so that hydraulic lines may be easily constructed.

In each shifting step, two frictional elements are operated so that size of a hydraulic pump may be reduced and hydraulic pressure control efficiency may be enhanced.

For convenience in explanation and accurate definition in the appended claims, the term "forward" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for a vehicle, comprising:
    a first planetary gear set that is a simple planetary gear set, and comprises a first rotational element operating as a fixed element, a second rotational element outputting a reduced rotational speed, and a third rotational element directly connected with an input shaft and operating as an input element;
    a second planetary gear set that is a simple planetary gear set and comprises a fourth rotational element directly connected with the second rotational element, a fifth rotational element selectively connected with a transmission housing by interposing a first brake therebetween, and a sixth rotational element selectively connected with the transmission housing by interposing a second brake therebetween, wherein a first clutch selectively connects at least two rotational elements of the fourth, fifth, and sixth rotational elements; and
    a third planetary gear set that is a compound planetary gear set combined by a single pinion planetary gear set and a double pinion planetary gear set, and comprises a seventh rotational element directly connected with the sixth rotational element, an eighth rotational element selectively connected with the input shaft by interposing a second clutch therebetween and selectively connected with the transmission housing by interposing a third brake therebetween, a ninth rotational element connected with an output shaft, and a tenth rotational element connected with the fourth rotational element by interposing a third clutch therebetween,
    wherein a fourth clutch is disposed between the seventh rotational element and the eighth rotational element.

2. The gear train of an automatic transmission for a vehicle of claim 1, wherein:
    the first planetary gear set is a single pinion planetary gear set, the first rotational element is a first sun gear, the second rotational element is a first planet carrier, and the third rotational element is a first ring gear;
    the second planetary gear set is a single pinion planetary gear set, the fourth rotational element is a second sun gear, the fifth rotational element is a second planet carrier, and the sixth rotational element is a second ring gear; and
    the third planetary gear set comprises the seventh rotational element that is a third sun gear engaged with a long pinion, the eighth rotational element that is a third planet carrier, the ninth rotational element that is a third ring gear, and the tenth rotational element that is a fourth sun gear engaged with a short pinion.

3. The gear train of an automatic transmission for a vehicle of claim 2, wherein the first clutch is disposed between the fifth rotational element and the sixth rotational element.

4. The gear train of an automatic transmission for a vehicle of claim 2, wherein the first clutch is disposed between the fourth rotational element and the fifth rotational element.

5. The gear train of an automatic transmission for a vehicle of claim 2, wherein the first clutch is disposed between the fourth rotational element and the sixth rotational element.

6. The gear train of an automatic transmission for a vehicle of claim 1, wherein:

the first planetary gear set is a single pinion planetary gear set, the first rotational element is a first sun gear, the second rotational element is a first planet carrier, and the third rotational element is a first ring gear;

the second planetary gear set is a double pinion planetary gear set, the fourth rotational element is a second sun gear, the fifth rotational element is a second ring gear, and the sixth rotational element is a second planet carrier; and the third planetary gear set comprises the seventh rotational element that is a third sun gear engaged with a long pinion, the eighth rotational element that is a third planet carrier, the ninth rotational element that is a third ring gear, and the tenth rotational element that is a fourth sun gear engaged with a short pinion.

7. The gear train of an automatic transmission for a vehicle of claim 6, wherein the first clutch is disposed between the fifth rotational element and the sixth rotational element.

8. The gear train of an automatic transmission for a vehicle of claim 6, wherein the first clutch is disposed between the fourth rotational element and the fifth rotational element.

9. The gear train of an automatic transmission for a vehicle of claim 6, wherein the first clutch is disposed between the fourth rotational element and the sixth rotational element.

10. The gear train of an automatic transmission for a vehicle of claim 1, wherein:

the first planetary gear set is a double pinion planetary gear set, the first rotational element is a first sun gear, the second rotational element is a first ring gear, and the third rotational element is a first planet carrier;

the second planetary gear set is a single pinion planetary gear set, the fourth rotational element is a second sun gear, the fifth rotational element is a second planet carrier, and the sixth rotational element is a second ring gear; and the third planetary gear set comprises the seventh rotational element that is a third sun gear engaged with a long pinion, the eighth rotational element that is a third planet carrier, the ninth rotational element that is a third ring gear, and the tenth rotational element that is a fourth sun gear engaged with a short pinion.

11. The gear train of an automatic transmission for a vehicle of claim 10, wherein the first clutch is disposed between the fifth rotational element and the sixth rotational element.

12. The gear train of an automatic transmission for a vehicle of claim 10, wherein the first clutch is disposed between the fourth rotational element and the fifth rotational element.

13. The gear train of an automatic transmission for a vehicle of claim 10, wherein the first clutch is disposed between the fourth rotational element and the sixth rotational element.

14. The gear train of an automatic transmission for a vehicle of claim 1, wherein:

the first planetary gear set is a double pinion planetary gear set, the first rotational element is a first sun gear, the second rotational element is a first ring gear, and the third rotational element is a first planet carrier;

the second planetary gear set is a double pinion planetary gear set, the fourth rotational element is a second sun gear, the fifth rotational element is a second ring gear, and the sixth rotational element is a second planet carrier; and the third planetary gear set comprises the seventh rotational element that is a third sun gear engaged with a long pinion, the eighth rotational element that is a third planet carrier, the ninth rotational element that is a third ring gear, and the tenth rotational element that is a fourth sun gear engaged with a short pinion.

15. The gear train of an automatic transmission for a vehicle of claim 14, wherein the first clutch is disposed between the fifth rotational element and the sixth rotational element.

16. The gear train of an automatic transmission for a vehicle of claim 14, wherein the first clutch is disposed between the fourth rotational element and the fifth rotational element.

17. The gear train of an automatic transmission for a vehicle of claim 14, wherein the first clutch is disposed between the fourth rotational element and the sixth rotational element.

18. A gear train of an automatic transmission for a vehicle, comprising:

a first planetary gear set that is a simple planetary gear set, and comprises a first rotational element operating as a fixed element, a second rotational element outputting a reduced rotational speed, and a third rotational element directly connected with an input shaft and operating as an input element;

a second planetary gear set that is a simple planetary gear set and comprises a fourth rotational element directly connected with the second rotational element, a fifth rotational element selectively connected with a transmission housing by interposing a first brake therebetween, and a sixth rotational element selectively connected with the transmission housing by interposing a second brake therebetween, wherein a first clutch selectively connects at least two rotational elements of the fourth, fifth, and sixth rotational elements; and a third planetary gear set that is a compound planetary gear set combined by a single pinion planetary gear set and a double pinion planetary gear set, and comprises a seventh rotational element directly connected with the sixth rotational element, an eighth rotational element selectively connected with the input shaft by interposing a second clutch therebetween and selectively connected with the transmission housing by interposing a third brake therebetween, a ninth rotational element connected with an output shaft, and a tenth rotational element connected with the fourth rotational element by interposing a third clutch therebetween, wherein a fourth clutch selectively connects at least two rotational elements of the seventh, eighth, ninth, and tenth rotational elements.

19. A passenger vehicle comprising the gear train of an automatic transmission for a vehicle of claim 1.

20. A passenger vehicle comprising the gear train of an automatic transmission for a vehicle of claim 18.

* * * * *